United States Patent
Garcia et al.

(10) Patent No.: US 6,862,109 B2
(45) Date of Patent: Mar. 1, 2005

(54) FAST BUILDING OF MASKS FOR USE IN INCREMENTAL PRINTING

(75) Inventors: Joan Manel Garcia, Barcelona (ES); Matt Bonner, Barcelona (ES); Mark Hickman, Vancouver, WA (US); Josep Maria Serra, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/373,219

(22) Filed: Feb. 24, 2003

(65) Prior Publication Data

US 2003/0169441 A1 Sep. 11, 2003

Related U.S. Application Data

(63) Continuation of application No. 09/150,322, filed on Sep. 9, 1998, now Pat. No. 6,542,258.

(51) Int. Cl.[7] .............................................. G06K 15/00
(52) U.S. Cl. ...................... 358/1.8; 358/3.13; 358/3.2
(58) Field of Search ................................. 358/456, 457, 358/458, 463, 464, 1.9, 1.5, 517, 500, 1.3, 1.2, 3.06, 3.07, 3.08, 3.09, 3.1; 347/47, 54, 78, 3, 43

(56) References Cited

U.S. PATENT DOCUMENTS

| | | | | |
|---|---|---|---|---|
| 5,001,575 A | * | 3/1991 | Nakahara | 358/451 |
| 5,111,310 A | * | 5/1992 | Parker et al. | 358/456 |
| 5,341,228 A | * | 8/1994 | Parker | 358/534 |
| 5,442,385 A | * | 8/1995 | Moon | 347/43 |
| 5,477,305 A | * | 12/1995 | Parker | 358/456 |
| 5,543,941 A | * | 8/1996 | Parker | 358/534 |
| 5,574,832 A | * | 11/1996 | Towery | 395/109 |
| 5,677,716 A | * | 10/1997 | Cleveland | 347/37 |
| 5,818,474 A | * | 10/1998 | Takahashi | 347/15 |
| 5,883,975 A | * | 3/1999 | Narita | 382/232 |
| 6,021,255 A | * | 2/2000 | Hayashi | 395/109 |
| 6,033,048 A | * | 3/2000 | Nicoloff, Jr. et al. | 347/12 |
| 6,542,258 B1 | * | 4/2003 | Garcia | 358/1.9 |
| 6,594,400 B1 | * | 7/2003 | Kim | 382/268 |

* cited by examiner

Primary Examiner—Jerome Grant, II
(74) Attorney, Agent, or Firm—Peter Lippman

(57) ABSTRACT

A program with complete conditions for a usable mask yields a unitary mask, each try. One mask pattern is used throughout an image, but may be "tiled". Preferably the program, for given mask position, expresses favorability of several candidate pass numbers as a "neighborhood constraint" in the form of a weight; distills the weights into one weight for each pass number; based on that, chooses a number for the position; and iterates for all positions. Many preferences are very useful, e. g. automatically balancing randomness vs. determinism, and several generalized relative notations. Another invention facet uses an input text file of mask constraints; a program reads constraints from the file, applies them, forms a mask and stores/uses it. Another reprocesses a mask for best image quality, fixing its own imperfections of first-round mask forming.

5 Claims, 15 Drawing Sheets

$$[C] = \begin{bmatrix} 0 & 1 & 1 \\ 1 & X & 1 \\ 1 & 1 & 0 \end{bmatrix} \quad \textbf{Fig. 1}$$

$$[M] = \begin{bmatrix} 5 & 3 & \cdots & 2 & 6 \\ 2 & & & & 3 \\ \vdots & & & & \vdots \\ 1 & & & & 2 \\ 8 & 7 & \cdots & 1 & 4 \end{bmatrix} \quad \textbf{Fig. 2}$$

$$[C] = \begin{bmatrix} c_{-r,-s} & \cdots & c_{-r,-1} & c_{-r,0} & c_{-r,1} & \cdots & c_{-r,s} \\ & & & \vdots & & & \\ c_{-1,-s} & \cdots & c_{-1,-1} & c_{-1,0} & c_{-1,1} & \cdots & c_{-1,s} \\ c_{0,-s} & \cdots & c_{0,-1} & X & c_{0,1} & \cdots & c_{0,s} \\ c_{1,-s} & \cdots & c_{1,-1} & c_{1,0} & c_{1,1} & \cdots & c_{1,s} \\ & & & \vdots & & & \\ c_{r,-s} & \cdots & c_{r,-1} & c_{r,0} & c_{r,1} & \cdots & c_{r,s} \end{bmatrix} \quad \textbf{Fig. 3}$$

$$[C] = \begin{bmatrix} 1 & 1 & 3 \\ 2 & X & 1 \\ 0 & 1 & 0 \end{bmatrix} \quad \textbf{Fig. 4}$$

$$[M] = \begin{bmatrix} \ddots & & \vdots & & \iddots \\ & 3 & 4 & 6 & \\ \cdots & 1 & ? & 5 & \cdots \\ & 2 & 3 & 2 & \\ \iddots & & \vdots & & \ddots \end{bmatrix} \quad \textbf{Fig. 5}$$

$$[M] \circ [C] = \begin{bmatrix} \ddots & & \vdots & & \iddots \\ & ]3-1.3+1[ & ]4-1.4+1[ & ]6-3.6+3[ & \\ \cdots & ]1-2.1+2[ & ? & ]5-1.5+1[ & \cdots \\ & ]2-0.2+0[ & ]3-1.3+1[ & ]2-0.2+0[ & \\ \iddots & & \vdots & & \ddots \end{bmatrix} = \begin{bmatrix} \ddots & & \vdots & & \iddots \\ & ]2,4[ & ]3,5[ & ]3,1[ & \\ \cdots & ]7,3[ & ? & ]4,6[ & \cdots \\ & ]2,2[ & ]2,4[ & ]2,2[ & \\ \iddots & & \vdots & & \ddots \end{bmatrix} \quad \textbf{Fig. 6}$$

$$\forall (f,c), m_{f,c} \notin \bigcup_{\substack{\forall i \in [-r,r] \\ \forall j \in [-s,s]}} ]m_{f+i,c-j} - c_{i,j} \cdot m_{f-i,c+j} + c_{i,j}[ ; \quad \textbf{Fig. 7}$$

$$[C] = \begin{bmatrix} c_{-1,-1} & c_{-1,0} & c_{-1,1} \\ c_{0,-1} & X & c_{0,1} \\ c_{1,-1} & c_{1,0} & c_{1,1} \end{bmatrix} \quad \textbf{Fig. 8}$$

$$[M] = \begin{bmatrix} \ddots & & & \vdots & & & \iddots \\ \cdots & m_{f-1,c-2} & m_{f-1,c-1} & m_{f-1,c} & m_{f-1,c+1} & m_{f-1,c+2} & \cdots \\ \cdots & m_{f,c-2} & m_{f,c-1} & ? & & & \\ & & & & & & \end{bmatrix} \quad \textbf{Fig. 9}$$

$$m_{f,c} \notin ]m_{f-1,c-1} - c_{1,1} \cdot m_{f-1,c-1} + c_{1,1}[ \cup ]m_{f-1,c} - c_{1,0} \cdot m_{f-1,c} + c_{1,0}[ \cup ]m_{f-1,c+1} - c_{1,-1} \cdot m_{f-1,c+1} + c_{1,-1}[ \cup$$
$$]m_{f,c-1} - c_{0,1} \cdot m_{f,c-1} + c_{0,1}[$$

Fig. 10

$$n_f = (2 \cdot c_{1,1} - 1) + (2 \cdot c_{1,0} - 1) + (2 \cdot c_{1,-1} - 1) + (2 \cdot c_{0,1} - 1)$$
$$n_f = 2 \cdot (c_{1,1} + c_{1,0} + c_{1,-1} + c_{0,1}) - 4$$

$$m_{f,c} \notin ]m_{f-1,c-1} - c_{-1,-1}, m_{f-1,c-1} + c_{-1,-1}[ \cup ]m_{f-1,c} - c_{-1,0}, m_{f-1,c} + c_{-1,0}[ \cup ]m_{f-1,c+1} - c_{-1,1}, m_{f-1,c+1} + c_{-1,1}[ \cup$$
$$]m_{f,c-1} - c_{0,-1}, m_{f,c-1} + c_{0,-1}[$$

$$n_b = 2 \cdot (c_{-1,-1} + c_{-1,0} + c_{-1,1} + c_{0,-1}) - 4 \quad \text{Fig. 13}$$

$$c_{-1,-1} = c_{1,1}; \; c_{-1,0} = c_{1,0}; \; c_{-1,1} = c_{1,1}; \; c_{-1,1} = c_{1,-1}; \; c_{0,-1} = c_{0,1} \quad \text{Fig. 14}$$

$$[C] = \begin{bmatrix} c_{1,1} & c_{1,0} & c_{1,-1} \\ c_{0,1} & X & c_{0,1} \\ c_{1,-1} & c_{1,0} & c_{1,1} \end{bmatrix} \qquad [M] = \begin{bmatrix} \ddots & & \vdots & & \ddots \\ \cdots & m_{f-1,c-2} & m_{f-1,c-1} & m_{f-1,c} & m_{f-1,1} & m_{f-1,2} & \cdots \\ \cdots & m_{f,c-2} & m_{f,c-1} & ? & m_{f,1} & m_{f,2} & \cdots \end{bmatrix} \quad \text{Fig. 15}$$

Fig. 16

Forward compatibility:

$$m_{f,c} \notin ]m_{f,1} - c_{0,-1}, m_{f,1} + c_{0,-1}[;$$

Backward compatibility:

Fig. 17

$$m_{f,c} \notin ]m_{f,1} - c_{0,1}, m_{f,1} + c_{0,1}[;$$

$$[M] = \begin{bmatrix} \ddots & & \vdots & & \ddots \\ \cdots & m_{f-1,c-2} & m_{f-1,c-1} & m_{f-1,c} & m_{f-1,c+1} & m_{f-1,c+2} & \cdots \\ \cdots & m_{f,c-2} & m_{f,c-1} & ? & & & \cdots \\ \cdots & m_{1,c-2} & m_{1,c-1} & m_{1,c} & m_{1,c-1} & m_{1,c+2} & \cdots \\ \ddots & & \vdots & & \ddots \end{bmatrix} \quad \text{Fig. 18}$$

Fig. 19

Forward compatibility:

$$m_{f,c} \notin \,]m_{1,c-1} - c_{-1,1}, m_{1,c-1} + c_{-1,1}[\, \cup \,]m_{1,c} - c_{-1,0}, m_{1,c} + c_{-1,0}[\, \cup \,]m_{1,c-1} - c_{-1,-1}, m_{1,c-1} + c_{-1,-1}[\,;$$

Backward compatibility:

$$m_{f,c} \notin \,]m_{1,c-1} - c_{1,-1}, m_{1,c-1} + c_{1,-1}[\, \cup \,]m_{1,c} - c_{1,0}, m_{1,c} + c_{1,0}[\, \cup \,]m_{1,c+1} - c_{1,1}, m_{1,c-1} + c_{1,1}[\,;$$

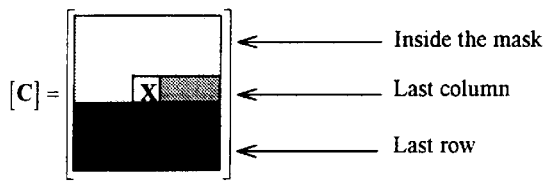

← Inside the mask
← Last column   Fig. 20
← Last row $$S_1 = \{s_1, s_1 + 1, \ldots, s_1 + n_1 - 1\};$$
$$\vdots$$
$$S_q = \{s_q, s_q + 1, \ldots, s_q + n_q - 1\};$$

Fig. 21

$$nP > \sum_{i=1}^{q} n_i \quad \textbf{Fig. 22}$$

$$P_i = \frac{n_i}{nP} \quad \textbf{Fig. 23} \qquad P_{i,j} = \frac{n_i - n_{i,j}}{nP} \quad \textbf{Fig. 24} \qquad n_{i,j} = \frac{n_i \cdot n_j}{nP} \quad \textbf{Fig. 25}$$

$$P = 1 - \left( \frac{n_1}{nP} + \left( \frac{n_2}{nP} - \frac{n_1 \cdot n_2}{nP^2} \right) + \left( \frac{n_3}{nP} - \frac{n_1 \cdot n_3 + n_2 \cdot n_3}{nP^2} \right) + \ldots + \left( \frac{n_q}{nP} - \frac{1}{nP^2} \cdot \sum_{k=1}^{n_q-1} n_q \cdot n_k \right) \right) \quad \textbf{Fig. 26}$$

$$[C] = \begin{bmatrix} c_{r,s} & \cdots & c_{r,1} & c_{r,0} & c_{r,-1} & \cdots & c_{r,-s} \\ & & & \vdots & & & \\ c_{1,s} & \cdots & c_{1,1} & c_{1,0} & c_{1,-1} & \cdots & c_{1,-s} \\ c_{0,s} & \cdots & c_{0,1} & X & c_{0,1} & \cdots & c_{0,s} \\ c_{1,-s} & \cdots & c_{1,-1} & c_{1,0} & c_{1,1} & \cdots & c_{1,s} \\ & & & \vdots & & & \\ c_{r,-s} & \cdots & c_{r,-1} & c_{r,0} & c_{r,1} & \cdots & c_{r,s} \end{bmatrix} \begin{matrix} \\ \\ 1 \\ 2 \\ 3 \\ \\ \end{matrix} \quad \textbf{Fig. 27}$$

$$[c] = \begin{bmatrix} 1 & & \\ 2 & 3 & \\ 1 & 1 & 4 \end{bmatrix}$$

$$[c] = \begin{bmatrix} c_1 & & \\ c_2 & c_2 & \\ c_3 & c_3 & c_3 \end{bmatrix}, \text{ or}$$ Fig. 36

$$[c] = \begin{bmatrix} c_1 & & \\ c_1 & c_2 & \\ c_1 & c_2 & c_3 \end{bmatrix}$$ Fig. 35

Fig. 37 $$[c] = \begin{bmatrix} c_1 & & & & & & & \\ c_2 & c_2 & & & & & & \\ c_3 & c_3 & c_3 & & & & & \\ c_4 & c_4 & c_4 & c_4 & & & & \\ c_5 & c_5 & c_5 & c_5 & d_5 & & & \\ c_6 & c_6 & c_6 & c_6 & d_6 & d_6 & & \\ c_7 & c_7 & c_7 & c_7 & d_7 & d_7 & d_7 & \\ c_8 & c_8 & c_8 & c_8 & d_8 & d_8 & d_8 & d_8 \end{bmatrix}$$

Fig. 38 $c_i \neq d_i \forall i$ $$[C] = \begin{bmatrix} 0 & 1 & 0 \\ 1 & X & 0 \\ 0 & 0 & 0 \end{bmatrix}$$ Fig. 39

$$[c] = \begin{bmatrix} c_{11} & & & \\ c_{21} & c_{22} & & \\ \vdots & & & \\ c_{d1} & c_{d2} & \cdots & c_{dd} \end{bmatrix}$$ Fig. 40

$$[M] = \begin{bmatrix} & \vdots & \\ \cdots & \begin{bmatrix} c^{fc}_{11} & & & \\ c^{fc}_{21} & c^{fc}_{22} & & \\ \vdots & & & \\ c^{fc}_{d1} & c^{fc}_{d2} & \cdots & c^{fc}_{dd} \end{bmatrix} & \cdots \\ & \vdots & \end{bmatrix}$$

Fig. 41

$$[R] = \begin{bmatrix} r_{-r,-s} & \cdots & r_{-r,-1} & r_{-r,0} & r_{-r,1} & \cdots & r_{-r,s} \\ & & & \vdots & & & \\ r_{-1,-s} & \cdots & r_{-1,-1} & r_{-1,0} & r_{-1,1} & \cdots & r_{-1,s} \\ r_{0,-s} & \cdots & r_{0,-1} & X & r_{0,1} & \cdots & r_{0,s} \\ r_{1,-s} & \cdots & r_{1,-1} & r_{1,0} & r_{1,1} & \cdots & r_{1,s} \\ & & & \vdots & & & \\ r_{r,-s} & \cdots & r_{r,-1} & r_{r,0} & r_{r,1} & \cdots & r_{r,s} \end{bmatrix}$$

Fig. 42

Fig. 43 $$[R] = \begin{bmatrix} r_{r,s} & \cdots & r_{r,1} & r_{r,0} & r_{r,-1} & \cdots & r_{r,-s} \\ & & & \vdots & & & \\ r_{1,s} & \cdots & r_{1,1} & r_{1,0} & r_{1,-1} & \cdots & r_{1,-s} \\ r_{0,s} & \cdots & r_{0,1} & X & r_{0,-1} & \cdots & r_{0,-s} \\ r_{1,-s} & \cdots & r_{1,-1} & r_{1,0} & r_{1,1} & \cdots & r_{1,s} \\ & & & \vdots & & & \\ r_{r,-s} & \cdots & r_{r,-1} & r_{r,0} & r_{r,1} & \cdots & r_{r,s} \end{bmatrix}$$

US 6,862,109 B2

FAST BUILDING OF MASKS FOR USE IN INCREMENTAL PRINTING

RELATED PATENT DOCUMENTS

This is a continuation of application Ser. No. 09/150,322 filed on Sep. 9, 1998 now U.S. Pat. No. 6,542,258.

Eight closely related documents are other, coowned and copending U.S. utility-patent applications Ser. Nos. 08/810,053, 08/810,747, 08/810,753, 08/811,788, and 08/811,875 all filed Mar. 4, 1997, of Josep Maria Serra et al.; Ser. No. 08/814,949 filed Mar. 10, 1997, of Michael Chang et al.; Ser. No. 08/957,853 filed Oct. 27, 1997, of Amir Doron et al.; and Ser. No. 08/789,859 filed Jan. 28, 1997, of Irene Heitsch. These eight applications have respectively issued as U.S. Pat. No. 6,019,454 on Feb. 1, 2000; U.S. Pat. No. 6,250,739 on Jun. 26, 2001; U.S. Pat. No. 6,067,405 on May 23, 2000; U.S. Pat. No. 6,367,908 on Apr. 9, 2002; U.S. Pat. No. 6,142,605 on Nov. 7, 2000; U.S. Pat. No. 6,082,849 on Jul. 4, 2000; U.S. Pat. No. 6,157,461 on Dec. 5, 2000; and U.S. Pat. No. 5,974,228 on Oct. 26, 1999. Two other closely related documents are coowned utility-patent applications filed in the United States Patent and Trademark Office substantially contemporaneously with this document. One is in the names of Joan Manel Garcia et al., and entitled "MASKS ON DEMAND FOR USE IN INCREMENTAL PRINTING"—and subsequently assigned utility-patent application Ser. No. 09/150,321. The other such document is in the names of Joan Manel Garcia et al., and entitled "OPTIMAL-SIZE AND NOZZLE-MODULATED MASKS FOR USE IN INCREMENTAL PRINTING"—and subsequently assigned utility-patent application Ser. No. 09/150,323. All the above ten documents are hereby incorporated by reference in their entireties into this document.

MICROFICHE APPENDIX

The appendix of seventy-two frames is a program definition document for firmware and software discussed herein. The second and third frames are a table of contents.

FIELD OF THE INVENTION

This invention relates generally to machines and procedures for incremental printing or copying of text or graphics on printing media such as paper, transparency stock, or other glossy media; and more particularly to a machine and method that construct—under direct computer control—text or images from individual colorant spots created on a printing medium, in a two-dimensional pixel array. For purposes of this document, by the phrases "incremental printing" and "incremental printer" I mean to encompass all printers and copiers that perform computer-controlled construction of images by small increments.

The invention advances the art of both printmasks and halftoning or so-called "dither" masks. For the sake of simplicity the invention will be described primarily with respect to printmasks, but it is to be understood that in many cases this term equivalently encompasses halftoning or dither masks. Without further elaboration, a person of common skill in the art will readily understand when such equivalency is present and when it is not.

The invention employs printmode and dithering techniques to optimize image quality vs. operating time and data-storage costs, and is particularly but not exclusively beneficial in scanning thermal-inkjet machines and methods. For definiteness the discussion in this document will refer to inkdrops, coalescence and other features and phenomena associated with inkjet printers; however, it is to be understood that equivalent characteristics of other printer types are encompassed within that discussion.

BACKGROUND OF THE INVENTION

Inkjet printers, and certain other types of incremental printers, are inherently capable of a very limited number of tonal levels. To achieve a moderate range of tonal variations in such printers, halftoning or dither masks are used to transform or "render" input variations in intensity in the form of spatially varying densities.

The eye integrates the spatial variations to, in effect, reconstruct a semblance of continuous-tone capability. The halftoning process, in incremental printers, sometimes employs masks known as dither masks or halftone masks, and the preparation of these masks is a matter of importance in terms of preparation time, data storage, and final output image quality.

To achieve vivid colors in inkjet printing with aqueous inks, and to substantially fill the white space between addressable pixel locations, ample quantities of ink must be deposited. Doing so, however, requires subsequent removal of the water base—by evaporation (and, for some printing media, absorption)—and this drying step can be unduly time consuming.

In addition, if a large amount of ink is put down all at substantially the same time, within each section of an image, related adverse bulk-colorant effects arise. These include so-called "coalescence" and "bleed" of one color into another (particularly noticeable at color boundaries that should be sharp), "blocking" or offset of colorant in one printed image onto the back of an adjacent sheet with consequent sticking of the two sheets together (or of one sheet to pieces of the apparatus or to slipcovers used to protect the imaged sheet), and "cockle" or puckering of the printing medium. Various techniques, discussed below, are known for use together to moderate these adverse drying-time effects and bulk- or gross-colorant effects.

(a) Prior heat-application techniques—Among these techniques is heating the inked medium to accelerate evaporation of the water base or carrier. Heating, however, has limitations of its own; and in turn creates other difficulties due to heat-induced deformation of the printing medium.

Glossy stock warps severely in response to heat, and transparencies too can tolerate somewhat less heating than ordinary paper. Accordingly, heating has provided only limited improvement of drying characteristics for these plastic media.

As to paper, the application of heat and ink causes dimensional changes that affect the quality of the image or graphic. Specifically, it has been found preferable to precondition the paper by application of heat before contact of the ink; if preheating is not provided, so-called "end-of-page handoff" quality defects occur—this defect takes the form of a straight image-discontinuity band formed across the bottom of each page when the page bottom is released.

Preheating, however, causes loss of moisture content and resultant shrinking of the paper fibers. To maintain the paper dimensions under these circumstances the paper may be held in tension, but this too induces still other types of image defects requiring yet further innovation to overcome them.

(b) Printmode techniques—Another useful technique is laying down in each pass of the pen only a fraction of the total ink required in each section of the image—so that any areas left white in each pass are filled in by one or more later passes. This tends to control bleed, blocking and cockle by reducing the amount of liquid that is all on the page at any given time, and also may facilitate shortening of drying time.

The specific partial-inking pattern employed in each pass, and the way in which these different patterns add up to a single fully inked image, is known as a "print mode". Heretofore most efforts in design of print modes have focused upon difficulties introduced by regularity or repetition of patterns previously regarded as inherent in printmode techniques.

For example, some print modes such as square or rectangular checkerboard-like patterns tend to create objectionable moire effects when frequencies or harmonics generated within the patterns are close to the frequencies or harmonics of interacting subsystems. Such interfering frequencies may arise in dithering subsystems sometimes used to help control the paper advance or the pen speed.

More recently, however, attention has turned to use of random or more-properly "randomized" patterns. These are introduced in the coowned patent documents listed earlier and will be discussed in greater detail shortly.

(c) Known technology of printmodes: general introduction—The pattern used in printing each nozzle section is known as the "printmode mask" or "printmask". The term "printmode" is more general, usually encompassing a description of a mask, the number of passes required to reach full density and the number of drops per pixel defining "full density".

One particularly simple way to divide up a desired amount of ink into more than one pen pass is the checkerboard pattern mentioned above: every other pixel location is printed on one pass, and then the blanks are filled in on the next pass. This pioneering strategy was quickly recognized as inadequate for highly demanding competitive modern printers because of ink coalescence along diagonals, inability to correct moire phenomena, and also the appearance of so-called "banding" or evident boundaries between abutting ink swaths.

To reduce such horizontal banding problems (and sometimes minimize the moire patterns) discussed above, a print mode may be constructed so that the paper advances between each initial-swath scan of the pen and the corresponding fill-swath scan or scans. In fact this can be done in such a way that each pen scan functions in part as an initial-swath scan (for one portion of the printing medium) and in part as a fill-swath scan.

This technique tends to distribute rather than accumulate print-mechanism error that is impossible or expensive to reduce. The result is to minimize the conspicuousness of—or, in simpler terms, to hide—the error at minimal cost.

All of these strategies are now well known and have been elaborated to a very great extent, including the use of space- and sweep-rotated printmode masks, autorotating printmode masks (in which rotation occurs even though the pen pattern is consistent over the whole pen array and is never changed between passes), and steeply angled, separated mask-pattern lines. An extensive discussion of such methods appears in U.S. Pat. No. 5,677,716 of Cleveland. Analogous problems and solutions are known in regard to dither masks as well.

(d) Nozzle-variation effects—Different groups or areas of nozzles in a pen have different effects on image quality. Only a few techniques have been introduced for adapting printer control mechanisms to accommodate or even exploit such variations.

European Patent 730,967 of Nicoloff et al. explains that overlap between two different-color inks, during a single scan, can be prevented by operating only a section of each nozzle array (i.e., pen) during such a single scan. It appears that the selection of the section to be operated, in Nicoloff, is consistent.

United Kingdom Patent 2,302,065 of Nobel et al. deals exclusively with text printing. It teaches variation of printhead alignment with respect to the lines of text, from page to page or at other intervals—so that top and bottom nozzles can be used about equally and also causes wear of middle nozzles to be more uniform.

As pens are fabricated by automatic techniques that continually increase in efficiency and speed, new kinds of nozzle variations continue to appear. Further development in the area of dealing with such variations is therefore needed.

(e) A new generation of banding problems—Heretofore, however, all these many ingenious stratagems have fallen short of eliminating banding. This is particularly true in the midtone range where small repetitive patterns, even subtle patterns, often become very objectionably conspicuous. Such difficulties are known in regard to both dither masks and printmasks.

Particularly as to the latter, the current generation of efforts includes the work outlined in at least the Serra and Chang documents to eliminate such problems by "randomizing" of masks, i.e. building masks by pseudorandom processes. Generally speaking, both these groups of workers teach the possibility of operating a randomized mask-building process in real time, in a printer—but reject that possibility, teaching away from it in favor of human inspection of computer-generated candidate masks, for best esthetics of printed results.

Chang suggests a balance between ink-media artifacts (which he associates with such esthetic choice by a live person) and mechanical artifacts (which he associates with randomization as a curative). Chang accordingly teaches that the inspection step is essential at least for the present.

The efforts of both Serra and Chang are distinct and important improvements over the prior art. With respect to their largest objectives, however, these efforts have foundered on the persistence of conspicuous and distinctive— even though substantially random—patterns that repeat dozens of times across a typical image.

In hindsight, the reason behind such persistence is clear. Operation of printers using these newest, randomized masks amounts to a superposition of a repeating mask pattern with a constant pattern of pen nozzle misdirections, weak or failed nozzles, and other flaws of static character. The system convolves the same mask patterns with the same nozzles over and over.

The resulting granularity is generally far larger than individual pixels or inkdrops. Although some shapes can be reduced for a particular image by tinkering with mask patterns, this approach too is typically prohibitive with common images—which are ordinarily very complex.

Of course it is not intended here to unduly criticize the contributions of these skillful and talented workers in this field, who have produced important and useful advances. Yet that effort leaves room for improvement.

Indeed, from the perspective of a skilled person in this field, intuitively it might appear that only a mask on the order of a major fraction of a full-page image would suffice to truly eliminate conspicuous patterning. From that perspective the results of these copending patent documents appear to be perhaps some two orders of magnitude away, in terms of mask size, from such an expectably successful size standard.

Earlier masks have been small. In the printing-medium advance direction (vertical for a portrait-format image), mask height customarily has been equal to the number of nozzles divided by the number of passes, or an even smaller quotient. In the scan-axis direction (horizontal), mask width ordinarily has been equal to the height or less—typically eight to thirty-two pixels.

These numbers represent very small fractions of a full-page image width at the modern resolution standard of twenty-four pixels per millimeter (six hundred pixels per inch). Even increasing mask size to, say a third or a half of full-page width calls for an increase by a factor of some fifty to seventy.

That is a daunting prospect, since such very large masks require very large memory—and different masks are required for various conditions, particularly including type of printing medium as well as printing speed. The cross-combinations of these conditions rise quickly to require at least some eight or twelve different masks. The cost of storing not one but numerous manufacturer-supplied multimegabyte-size masks, and the competitive handicap of requiring such mask storage in a computer attached to a printer, are all but prohibitive.

The picture as seen from the current generation of advances is similarly adverse with regard to generation of such large masks in the field. While the Serra results may provide somewhat better image quality, both the Serra and Chang algorithms appear to be too expensive computationally to implement in onboard processing systems of a printer, or even in a printer driver operable in most personal computers.

With such a strategy, a mask-building program might be started on a workstation to operate overnight, and the next day one or two more-or-less valid solutions might be found to test with real conditions. This alone points up a major drawback at a conceptual level: it is analogous to assigning a lower primate to press typewriter keys essentially at random—with a person necessarily inspecting the results from time to time to see whether what was typed makes sense.

If not, the person discards all of that and the animal starts again—a painfully inefficient procedure. Moreover, notwithstanding commitment to such a computationally intensive method, as already indicated the masks built in this way were rather small, on the order of sixteen by thirty pixels.

Another of the current generation of advances in the printmasking art, the Doron document mentioned earlier, proposes building a good mask automatically at each effort, and suggests that this may be accomplished within a printer in the field and in real time (i. e., when or shortly before the mask is needed). Doron indicates that a differently configured mask is selected for each printing operation—that is, for each printer pass in a repeating series of, say, four or five passes—and his approach evidently thus entails use of not one but several discrete masks for each image.

The printer selects a different one of these masks for each pass, which is to say that different masks are applied to printing of different image portions. In the earlier procedure of building a mask, Doron's procedure operates in a three-dimensional space that is a vertical stack of pixel grids, each successive grid or plane representing a higher layer of inkdrops applied in succeeding passes, or by later-arriving nozzles in a single pass.

Doron appears to introduce randomness at two stages of his procedures. First, in the mask-building stage he randomly selects a series of vertical columns in the stack—e. g., columns that underlie particular pixel positions in the topmost grid—for processing, one column at a time.

In processing each column he fills-in printing parameters for the several grids in the stack, observing selection rules that refer to columns which have been previously filled in. The selection rules appear to result in an essentially deterministic series of selected "parameter" numbers down the column, given the columns filled in previously. The random order of column selections in this way controls the final overall three-dimensional array of parameters.

Second, at run time Doron's control program randomly selects one of a number of the randomly generated masks for use in each "printing operation" as mentioned above. The degree of randomness in his pseudorandom system appears to be fixed by these two processes.

Although it uses plural masks in conjunction for printing of each image, his system appears to require relatively modest quantities of data storage. It requires more than just the storage for one mask, but less than would be required for permanent storage of all necessary masks, and a small amount in total because each of his masks is rather small.

The efficacy of the system is unclear, in that it attempts to rely upon continuously shifting among several available masks to break up patterning but the individual masks are small. Doron's mask height (i. e. a y dimension in the pixel grid) is his pen height, preferably one hundred twenty-eight pixels; however, his most-highly preferred mask width is said to be only thirty-two pixels.

Thus if the number of masks is also rather small, some potential for repetitive patterns breaking through may remain. On the other hand if the number of masks is adequately large and the selection truly randomized, then the system may exhibit adverse effects of highly random masking. Since such effects are part of the recognitions driving the present invention, they will be explained further in the following sections.

(f) Conclusion—As shown above and elaborated in the following sections, various obstacles of computing time, data storage, a fixed degree of randomness and repetitive small or narrow (although randomized) mask patterns have continued to impede achievement of uniformly excellent inkjet printing—at high throughput—on all industrially important printing media. Thus important aspects of the technology used in the field of the invention remain amenable to useful refinement.

SUMMARY OF THE DISCLOSURE

The present invention introduces such refinement. Before proceeding to a relatively rigorous description or definition, this section offers some informal comments that are for orientation only and should not be taken as defining the invention.

The terms "printmask" and "shingling mask" may be used interchangeably. Dither masks are used for a different purpose, as outlined earlier, and accordingly have distinctly different microstructure. Each of these three terms, however, refers to a two-dimensional array of cells in which each cell contains a given amount of ordered numbers. (Slightly nonidiomatic phrases such as "amount of . . . numbers" are used in this document in preference to phrases such as "number of numbers" that are idiomatically more common but confusing.)

In dither masks, each number in the cell represents, most typically, a discriminator number against which essentially a continuous-tone (or high-multilevel) signal is tested to determine whether inking in the corresponding pixel will occur or not. It is a decisional tool relating to spatial distribution of ink spots.

In printmasks, each number in the cell represents a pass in which a dot will be printed. Stepping or "tiling" this array in two orthogonal directions over the print medium describes the pass in which the printhead will fire each drop; thus a printmask is a decisional tool relating to temporal distribution of the spots ordained by the halftone or dither process.

The amount of numbers in a printmask cell equals the maximum number of drops that the printer can fire in any given pixel (dots per pixel, or "dpp"). The order of the numbers in the cell corresponds to the order of passes in which to fire: that is, the first number will be used for the first drop, the second number for the second drop in the same pixel location, and so on.

For a printer that can fire two drops per pixel, for example, the first number in a cell represents the pass number in which the first drop is to be fired; in case of firing a second drop, the second number will be used. A halftoning algorithm, which may operate in the printer or in an associated printer driver in a connected computer, controls the number of drops to fire in a given location.

The ordered set of numbers in each cell can be interpreted as representing a third dimension. A three-dot-per-pixel mask, for example, can be represented by three two-dimensional arrays, each one containing just one number per cell, and representing one level.

If only one drop has to be fired, the number in the lowest level array will be used; if two drops have to be fired, the numbers in the lowest level and the second level arrays will be used. In this document the arrays representing each level will be referred to as layers or planes—not to be confused with the color "planes" often mentioned in connection with multicolor printing.

This approach does not yield a completely general notation for masking. It implies that, if pass number n is being used when one drop has to be fired, passes n and m will be used for firing two drops, and passes number n, m and q for three drops. It could be desirable, though, to use pass n for just one drop, but passes m and q for two drops. The first approach may be called sequential, and will be the only one addressed here.

Designing a printmode determines the strategy that the printer will follow to put drops onto the paper. This strategy has to respect certain restrictions, and tries to accomplish certain goals of print quality and throughput.

The restrictions come from the physics of the pen and ink-media interaction: firing two consecutive drops, for instance, could cause the firing frequency of the pen to be too high, or placing two drops next to each other in the same pass would cause coalescence. Goals often come from marketplace considerations, and for dither masks they may take the form of "effective resolution of image detail finer than" a specified value; for printmasks they may instead take the form of "banding free" at some specified distance, or "better color gamut than" a specified product, or "image quality higher than" some known reference standard.

This document relates to an invention which in part represents an advance because it focuses on the restrictions, and particularly upon unambiguous ways to define them in symbols. Such notations will be described, and an analysis of the conditions under which it is always possible to create a mask that satisfies the restrictions will be offered.

The invention provides or includes a method for synthesizing masks, given restrictions expressed in such a form and under just such conditions. In contrast to related approaches discussed in an earlier section, the present invention defines a set of constraints—the grammatics, so to speak, which the unfortunate animal previously mentioned was supposed to respect, but was never taught.

The invention thereby, within the immediate process of building a mask, makes certain that every single element of the mask is going to respect them. This approach assures that every run of the algorithm will provide a valid solution. In comparison with the overnight techniques required to produce possibly usable 16×30 masks, the present invention operating on the same workstation finds a guaranteed-valid 512×512 mask in two or three seconds.

Small masks, large masks and the odds of finding a usable mask—Design of print modes has traditionally been limited to small printmasks, something like sixteen pixels wide by two hundred forth pixels tall. Such a limitation, together with a helpful restriction that divides the nozzles into zones corresponding to the number of passes, makes the problem a tractable one.

It is still difficult, but tractable. A writing-systems engineer can draw zeros and ones in the places where it is desirable for the pen to fire—and then can visually inspect the result, make sure the restrictions are respected, and even draw a nice pattern.

This method decides the strategy for putting the drops on the paper, looking at the pen. A printmask is designed to be the size of the nozzle plate, and in effect is something the pen carries with it. This has an important drawback: every defect, every pattern, will always be repeated in every swath the same way, thus having the tendency to produce bands.

This is where large printmasks can come into play. The basic idea is to change the focus from the pen to the plot. It is not necessary to be restricted to something the size of the pen that will be repeating. Instead it is possible to look at the plot and decide to ink one particular pixel in the first pass, another particular pixel in the fourth, and so on. In principle this can be done with any number of pixels, even with the entire image frame.

This approach, however, can no longer be followed with the traditional methods of the writing systems engineer. No amount of skill or patience would enable the engineer to manually find, for example, a 1024×1024 array of numbers that fulfills the required restrictions.

Given a certain number of passes, there is a maximum number of restrictions that will leave degrees of freedom to find the mask. More specifically, if the number of restrictions (expressed in a particular notation discussed later) is lower than the number of passes, it will always be possible to solve the problem with a deterministic algorithm.

If the number of restrictions is equal to or higher than the number of passes, finding a mask becomes a probabilistic exercise that depends on the size of the mask (it is possible to compute the probability). Such a mask is overconstrained and will not be possible to find with a deterministic straightforward algorithm. In general, it will require a number of iterations roughly related to the probability of finding a solution.

If the desired mask is small, even if the restrictions overconstrain the problem, it is relatively easy to find a solution. The odds, however, decrease drastically as the size of the mask increases.

The Tools, and How to Work with Large Masks—The innovations described in this document are associated with development of a computer program that, given a set of restrictions and a definition for the mask (size and number of passes), will try to find a mask that fulfills the restrictions. The phrase "try to find" here means that if the problem is underconstrained, the program will always find the mask on the first attempt; and if the problem is overconstrained it will sometimes find a solution and sometimes not.

This program can be caused to run in printer firmware, or in the processes of an application-specific integrated circuit (ASIC), or as part of a printer driver that in turn is running in a computer attached to a printer. The program can be used in a number of ways:

It can help in the design of small masks. It can be used to find underconstrained masks straightforwardly.

More interestingly, together with a shell script it is also able to find overconstrained masks; or it can be piped to another program and there used to find a mask that has certain special properties. In these last two cases, it becomes a new but much more sophisticated form of the previously discussed analogy to animals typing—but now with no need for human intervention to check quality.

It also can do the design of a large mask, as for instance a printmask that can be tiled with a set of restrictions. Again, if such a mask is underconstrained the program will always produce a solution.

If the large-mask problem is overconstrained, the number of trials needed will depend on the probability of finding a solution (in general, the number of trials may be unacceptably large). In this case the design can take either of two different approaches:

The designer of a mask decides what restrictions are necessary, how many passes and so on, and produces a mask of the desired size. This mask goes to the printer or driver, where it is stored and used.

In this case, the mask can be overconstrained (assuming the designer thinks this is necessary, and has enough computer power and time to find it). An important drawback is that the mask will have to be tiled, and this implies more restrictions.

The designer of the mask decides on the restrictions, number of passes and so on, and the printer uses them to produce the mask on the fly—in other words, in real time, while actually printing an image. This has two great advantages, coming from the fact that the mask doesn't have to be tiled: there are fewer restrictions, and there are no repeating patterns.

It also has disadvantages: the mask has to be produced straightforwardly, so it cannot be overconstrained. This approach also requires some computing power from the printer, but it appears feasible with some modern printers which answer to that requirement.

Constraints—a constraint for present purposes is defined as any design criterion that a mask is expected to satisfy. Two main types of constraint are currently in use: spatial constraints and (primarily for printmasks) pen-usage constraints. Constraints can be applied within a single plane of a mask, between planes, or between different masks (for example, to make certain that yellow will not print in the same pass as cyan).

(1) Neighborhood constraints—These are spatial constraints that define restrictions on the placement of dots with respect to a pivotal point (a central point in a constraint diagram as will be seen below), as a function of their relative position or so-called "distance", or both. In this section, which will be found most natural if interpreted in terms of printmasks, "distance" always means a difference between two pass numbers—so that in effect this "distance" is measured in units of time.

For example, if a position in the mask that has a value of four is at the pivotal point, and the neighbor in the relative position (−1,0), the point immediately to the left, has a value of one, then the distance is 4−1=3. Note also that since the number of passes is a repeating sequence from one to n, so that the pattern in effect wraps, the distance between n and one is one, not n−1.

All the points in the mask should comply with all neighborhood constraints. Neighborhood constraints are always defined as a function of relative positions with respect to a pivotal point: all the points in the mask should be able to function as pivotal points, and satisfy the defined constraints with respect to the defined neighbors. The only exceptions are the boundary cells of the mask; it is often favorable to define different neighborhood constraints for the center of the mask from those of the borders—the latter being sometimes called "seam constraints".

A general way to describe neighborhood/spatial constraints is defining, for any given neighbor, a weight for any given distance (distance, again, is here the difference between two pass numbers). The weight goes from zero (meaning forbidden) to one (meaning accepted).

For a particular pivotal point that can be any point in the matrix, constraints specify a set of limitations in terms of pass numbers for the neighbors. For example, this scheme default 1
(0,1) # the upper neighbor
[0:0.0] # distance 0 (i. e. same plane), weight 0.0
[1:0.0] # distance 1, weight 0.0 (i. e. forbidden)
(−1,0) # the left neighbor
[2:0.1] # distance 2, weight 0.1 ("almost forbidden")
[4:0.1] # distance 4, weight also 0.1 means that, for any given position in the mask, the upper neighbor has to be at least two passes away (cannot be equal, and cannot be either the preceding or the following value), and the left neighbor should be within a distance of zero, one, three or five (assuming for instance a printmask in a six-pass print mode).

This approach easily allows for constraining a mask such that no solution exists. Therefore care must be taken to ensure that a solution space does exist.

Another, less general but more intuitive way of specifying neighborhood constraints is the constraint matrix. It simply sets a value for each neighbor. That value is the distance, in number of passes, outside which the neighbor is expected to be from the pivotal point. In this example

| { 0 | 0 | 1 | 0 | 0 } |
|---|---|---|---|---|
| { 0 | 1 | 1 | 1 | 0 } |
| { 1 | 2 | x | 1 | 1 } |
| { 0 | 0 | 1 | 0 | 0 } | the "x" represents the pivotal point. The two to the left of the x means that the left horizontal neighbor is supposed to be outside an open range of two centered on x. If for example x=4, the left neighbor can be anything except three, four or five. Every point in the mask, when considered the pivot point, should comply with these restrictions.

Neighborhood constraints can be applied within a single plane of a mask, or can be used to relate different planes or different masks between them. As an example, suppose that an eight-pass printmask is to be built for a printer that can print two drops per pixel, but can only print one drop in a given location per pass. The mask must have two planes, and the two numbers corresponding to the same pixel on the two planes must always be different. Additionally, no point should fire in the same pass as the preceding or following pixel. These constraints can be written as follows, and will be explained below.

For the first layer: {1×1}—applied to itself
For the second layer: {1×1}—applied to itself and

| pixel | pass:weight | |
|---|---|---|
| ( 0,0) | [0:0.0] | |
| (−0,0) | [0:0.0] | } —applied to the first layer |
| ( 1,0) | [0:0.0] | |

The first-layer constraint, and the first constraint in the second-layer set, are the same, "{1×1}". This means that no consecutive neighbors are firing in the same pass.

The following group of constraints for the second layer has three lines. The first line says that, for the position (0,0)—that is, for the same location, but in the other layer—at a distance of zero, or in other words in the same pass, the weight is 0.0, forbidden. Thus two drops cannot be fired into the same pixel-grid location in both passes. The next two lines in the second-layer constraints enforce a requirement that the point in the second plane must also be different from the two horizontal neighbors in the first plane.

The neighborhood constraints have a symmetry redundancy. If the constraint {1x} is imposed for all the points, the converse constraint {x1} will also be fulfilled.

This property will be called polar symmetry. It represents a mathematical generalization that is important to the most-efficient practice of the invention, since it facilitates the progress of mask-building along a simple track from one corner of the mask grid across the first row, and then rasterwise similarly across the next row and so forth.

(2) Pen-usage constraints—This type of constraint specifies restrictions in the way the nozzles of the pen are used. For building printmasks, the fast mask generation method currently uses two types of nozzle constraint:

Nozzle-usage acceptance defines the level of acceptability of a given nozzle. Acceptability of zero means forbidden, acceptability of one means accepted without restriction. Any number in the closed range [1,0] is allowed.

Nozzle-usage distribution defines an expected or intended distribution of the nozzles. Here a one still means unlimited usage and a zero means forbidden, but the values within the range are specific fractions of use, or duty cycle, desired.

As an example of the difference between these two kinds of constraint, if 0.1 is specified as the usage acceptance of a particular nozzle, that nozzle is acceptable to use but only if there is no better option. If 0.1 is specified as the usage distribution of a particular nozzle, then when printing with the fully created mask this nozzle is expected to be used exactly ten percent of the time it would have been used normally—i. e. in a conventional system.

Basic algorithm—The building of a multilayer, sequential mask thus can be reduced to the problem of building each layer of the mask, with some constraints acting between layers. The fundamental algorithm preferably builds a plane by traversing the matrix sequentially, top-down and left-to-right (although other orders can be used without loss of generality).

When any given position of the mask is to be filled, all the existing neighbors (both in the plane being built and in the reference planes) have to be checked following the neighborhood-constraint definitions. The nozzle-usage acceptability and distribution tables, too, have to be checked. This implies, for each pass number, computing the nozzle that will fire it, checking this nozzle in a lookup table, and assigning the weight to the pass number in accordance.

After all the constraints have been applied to all the pass numbers, a set of weights for each possible candidate (pass number) is defined. The next step is to consolidate the different weights assigned to each candidate into one number.

The fast mask generator algorithm does this by assigning a zero (forbidden) for the final weight of a zero is present in any of the values assigned by the constraints, or otherwise a weighted average of all the values. Each value is weighted by the relative importance that the constraint which set it has assigned.

After all the candidates have been assigned a weight, taking into account all the constraints, a candidate has to be chosen to fill the position. The algorithm offers two approaches: the deterministic approach, which consists in choosing the best option (the candidate that has the highest weight), and the randomized approach, which treats the weight of each candidate as a probability.

Using the first option typically yields very ordered masks. The second option gives more random masks, with appearance that is more grainy but less mottled (i. e. repetitive).

Actual implementation of the algorithm allows the user to choose a decree of randomness: a value between zero and one, meaning the fraction of points within the mask that are to be chosen using the randomized strategy. All the rest are assigned deterministically, i. e. by picking the highest weighted candidate. The points that will be set with the randomized strategy are also randomly selected.

In one desirable variant, the degree of randomness is chosen automatically in response to an analysis of "activity" in the image. This form of the invention will be explained more fully below.

The foregoing may convey a general flavor of the subject matter of this document. This discussion now turns to a more formal presentation. In its preferred embodiments, the present invention has several aspects or facets that can be used independently, although they are preferably employed together to optimize their benefits.

In preferred embodiments of a first of its facets or aspects, the invention is a method of preparing and using a mask for incremental printing, using a preestablished program that incorporates complete conditions for a usable mask. The method includes the step of automatically operating the preestablished program that incorporates complete conditions for a usable mask.

This step produces a usable substantially unitary mask in substantially each attempt by the program. The method also includes the step of then automatically using the produced substantially unitary mask—or storing it for later use. The produced mask is for use substantially in common over an entire image, and substantially without human intervention as to mask content.

The term "unitary", and the reference to use "substantially in common over an entire image", for purposes of this document, merely mean that one single mask pattern is used throughout printing of an image—in other words, that no more than one pattern is used. The mask, however, is not necessarily the size of the full image or a full page. As will be seen shortly, the mask may be either such a full-size mask or a smaller mask that is stepped or "tiled" across the image or down the image, or both.

The foregoing may constitute a description or definition of the first facet of the invention in its broadest or most general form. Even in this general form, however, it can be seen that this aspect of the invention significantly mitigates the difficulties left unresolved in the art.

In particular, as will be seen in following sections of this document, the very capability to produce a mask very reliably and systematically is a key to correcting those difficulties. This first aspect of the invention accordingly eliminates the conventional reliance upon masks that are too small to avoid repeating patterns, and masks that are at the same time too large to provide economically within a printer, and masks that must be prepared at the factory and therefore cannot accommodate operating conditions.

Although this aspect of the invention in its broad form thus represents a significant advance in the art, it is preferably practiced in conjunction with certain other features or characteristics that further enhance enjoyment of overall benefits.

For example, it is preferred that the operating step include the substeps of:

considering candidate pass numbers, for a particular position in the mask, and expressing the favorability of each candidate pass number, with regard to each of plural neighboring positions, as a "neighborhood constraint" in the form of a respective weight;

consolidating the weights to obtain a single measure of favorability for each candidate pass number;

based on the single measure of favorability, choosing one of the candidate pass numbers for use at the particular position in the mask; and repeating the considering and expressing step, the consolidating step, and the choosing step for each other position in the mask.

Other preferences include limiting mask production based on relationships among successive layers of colorant; controlling the number of constraints so that adequate degrees of freedom remain to ensure that the program can find a solution in substantially each attempt; automatically selecting a balance between the relative degree of randomness and determinism in a mask to be produced; identifying nearby positions only by a substantially generalized explicit notation that is relative, substantially without reference to absolute position in the mask; and with respect to each nearby position that is thus identified by the generalized notation, expressing in only a substantially generalized explicit notation the acceptability of inking said pixel position in particular inkdrop planes of the mask.

Generalized notation is an important preference in the successful practice of this invention. One preferred type of such notation is use of a first numerical value representing a particular distance in three dimensions within the successive inkdrop planes; and coupled with the first numerical value, a second numerical value representing acceptability of inking at said particular distance. The significance of that second value may be a prohibition of inking, a relative permissibility of inking, or a relative probability to be applied in determining inking.

Another type of generalized notation includes a local grid including a representation of the pixel position of interest and some nearby pixel positions; and in at least some positions within the local grid, relative to the pixel under calculation, a numerical representation of the permissible or preferable distance to a position where inking may occur. It has been found that this type of notation is particularly powerful when the expressing step includes applying a condition that is substantially polar symmetric.

A second aspect of the invention is a method of preparing and using a mask for incremental printing. The method includes the step of, for a particular pixel position in a mask to be prepared, determining a multiplicity of numerical weighting values that respectively represent relative acceptability of inking in a particular inkdrop plane with respect to each of a multiplicity of operating conditions or other nearby positions.

Another step is consolidating the multiplicity of numerical weighting values to determine substantially a single numerical weighting value that represents overall relative acceptability of inking at the particular pixel position in the particular inkdrop plane.

The foregoing may constitute a description or definition of the second facet of the invention in its broadest or most general form. Even in this general form, however, it can be seen that this aspect of the invention too significantly mitigates the difficulties left unresolved in the art.

In particular, the use of weightings in a generalized notation represents an extremely powerful strategy for taking into account a very large number of operating conditions and constraints of various kinds, particularly with respect to inking levels in different inkdrop layers or planes. Thus again this second aspect of the invention serves as a key to resolution of difficult obstacles to a mask-generating system that can function quickly and yet with extreme reliability.

Preferences in regard to this second aspect of the invention will be elaborated further, later in this document. They particularly include evaluating the potential use of certain print nozzles for inking at a particular pixel position in a mask to be prepared; and taking into account the results of the evaluating step in determining relative acceptability of inking that particular pixel position, in a particular inkdrop plane, to prepare the mask.

In a third basic aspect or facet, the invention is a method for generating and employing masks for use in incremental printing, using a self-standing input text file of mask constraints, and also using a mask-generating control algorithm. The program includes the step of automatically reading the self-standing input text file to accept such constraints.

Another step is automatically accepting any definition of a mask-generating modular control algorithm that applies the mask constraints. Still another step is automatically generating a mask, under control of a printmask-generating modular control algorithm.

Further steps include automatically operating the defined mask-generating modular control algorithm to apply the mask constraints and thereby control the mask-generating step; and automatically forwarding the generated mask for use, or for storage and later use, in a printer or a printer driver for operating the printer to print images.

This third aspect of the invention thus focuses upon modularity of the primary algorithm or algorithms, as well as other forms of input. This characteristic renders the invention as a tool still more powerful. A preference in regard to this facet of the invention is combination of the host program with a mask-generating modular control-algorithm definition, functionally interfaced to the accepting step for acceptance thereby.

In a fourth aspect, the invention is a method for generating and employing masks for use in incremental printing, using a self-standing input text file of mask constraints, and also using a mask-optimizing control algorithm. The method includes the step of reading the self-standing input text file to accept such constraints.

It also includes applying the accepted constraints to generate a mask; and accepting any definition of a mask-optimizing modular control algorithm that receives said generated mask as an input and reprocesses said received mask to substantially optimize it for image quality. Other steps are operating the accepted mask-optimizing modular control algorithm to reprocess said received mask to substantially optimize it for image quality; and forwarding the optimized mask for use, or for storage and later use, in a printer or a printer driver for operating the printer to print images.

This aspect is particularly useful in that it provides a program that can correct its own imperfections in first-round mask generation efforts, if more-highly optimized results are desired.

All of the foregoing operational principles and advantages of the present invention will be more fully appreciated upon consideration of the following detailed description, with reference to the appended drawings, of which:

BRIEF DESCRIPTION OF THE DRAWINGS

FIG. 1 is an exemplary small constraint matrix for discussion in introducing some restriction notations used in practice of preferred embodiments of the invention;

FIG. 2 is a diagram representing a mask matrix;

FIG. 3 is a diagram representing a generalized constraint matrix;

FIG. 4 is another exemplary small constraint matrix;

FIG. 5 is a small exemplary portion of a mask;

FIG. 6 is an exemplary application of the FIG. 4 constraint matrix to the FIG. 5 mask;

FIG. 7 is a symbolic statement of the operation of a constraint matrix;

FIG. 8 is a generalized but small constraint matrix;

FIG. 9 is a small portion of a generalized mask, to which the FIG. 8 constraint matrix has been applied;

FIG. 10 is a symbolic statement of forward-compatibility constraints for the case of FIGS. 8 and 9;

FIG. 11 is a symbolic statement of the amount of numbers forbidden by the FIG. 10 constraints;

FIG. 12 is a statement like FIG. 10, but instead for backward-compatibility constraints;

FIG. 13 is a symbolic statement of the amount of numbers forbidden by the FIG. 12 constraints;

FIG. 14 is a symbolic statement of a symmetry condition that equalizes the FIG. 10 and FIG. 12 constraints;

FIG. 15 is a polar-symmetric matrix derived from the FIG. 8 constraint matrix when subjected to the conditions of FIG. 14;

FIG. 16 is a mask matrix like FIG. 5, but instead for the last column of a mask that has to be tiled;

FIG. 17 is a pair of statements like FIGS. 10 and 12, but instead for the FIG. 16 final column;

FIG. 18 is a matrix like FIG. 16, but instead for the last row of the mask;

FIG. 19 is a pair of statements like FIG. 17, but instead for the FIG. 18 last row;

FIG. 20 is a diagrammatic model of a preferred usage of the constraint space for polar-symmetric matrices only;

FIG. 21 is a symbolic definition of multiple sets of forbidden mask entries, related to discussion of probabilities and feasibility conditions;

FIG. 22 is an associated symbolic statement of a basic feasibility condition;

FIG. 23 is a symbolic statement of the probability of finding a certain number in a certain set of forbidden numbers;

FIG. 24 is a like statement of finding such a number in one such set but not another such set;

FIG. 25 is a symbolic statement of an average amount of numbers belonging to two such sets;

FIG. 26 is a symbolic statement of a joint probability of being able to fill a particular mask position;

FIG. 27 is a diagram of a general polar-symmetric matrix following the FIG. 20 model;

FIG. 35 is a representation of an exemplary cell in a composite mask, particularly for a three-drop-per-pixel mask;

FIG. 36 is a pair of exemplary restrictions within a cell such as that of FIG. 35;

FIG. 37 is another exemplary cell but for a four-drop-per-pixel maximum deposition per pass, and a total of eight passes per pixel;

FIG. 38 is a symbolic statement of a condition on the FIG. 37 cell;

FIG. 39 is an exemplary constraint matrix for discussion of composite-mask constraints;

FIG. 40 is a general format for a cell of d drops per pixel;

FIG. 41 is a likewise general format for a composite mask;

FIG. 42 is a general form of a constraint matrix for such a mask;

FIG. 43 is a general form of a polar-symmetric constraint matrix for such a mask;

DETAILED DESCRIPTION OF THE PREFERRED EMBODIMENTS

1. Basic Approach

Figure 28:
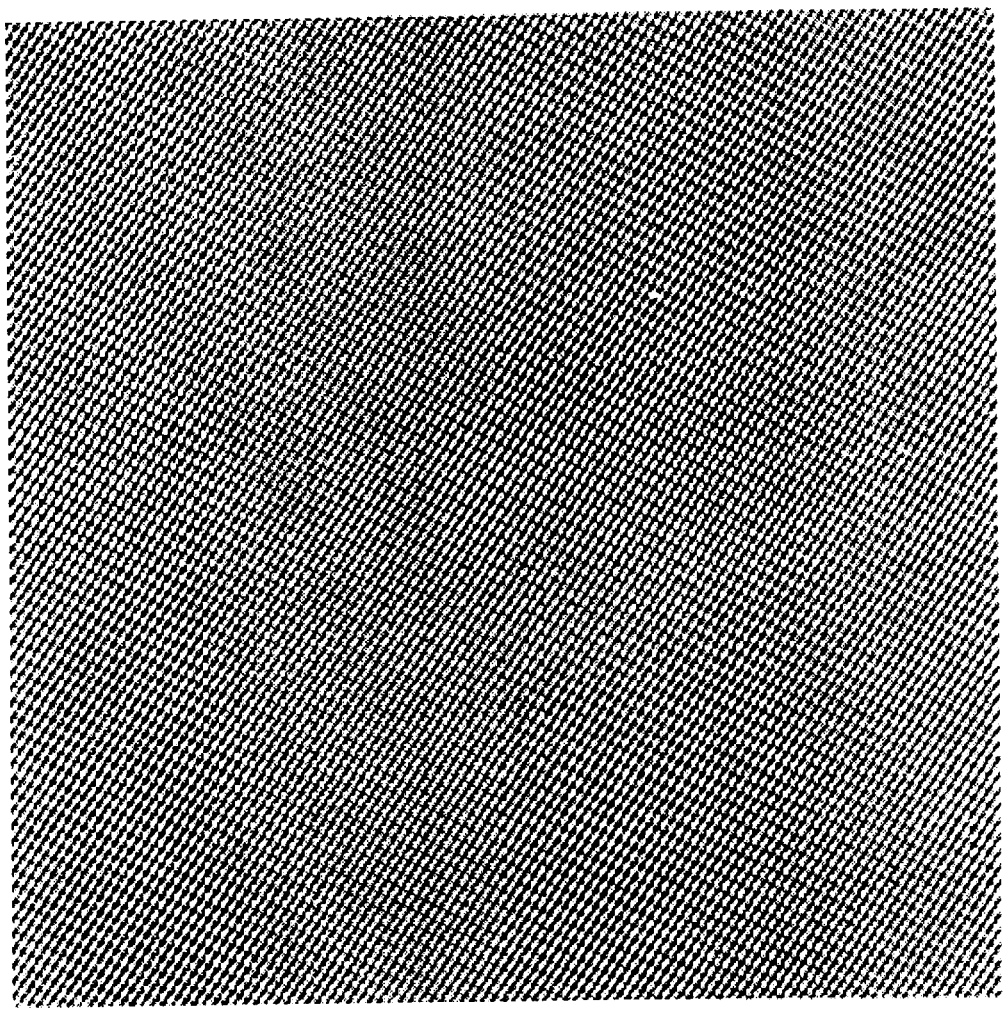
FIG. 28 is an enlarged rendering of a mask made with a high degree of determinism, wherein the various pass numbers are mapped to shades of gray for an intuitive presentation of the character of such a mask.

This section introduces with an example the novel method for building large masks. A more-general presentation appears in the next section.

The Mask—The mask is just an array of numbers, each one over a pixel, that in a printmask represent the pass in which that pixel will be printed and in a dither mask represent a discriminator against which input levels are to be tested. For example, the following printmask, with eight passes:

| 5 | 6 | 4 | 7 | 1 |
|---|---|---|---|---|
| 7 | 1 | 3 | 2 | 4 |
| 5 | 8 | 7 | 6 | 3 |
| 7 | 4 | 1 | 8 | 2 |
| 8 | 3 | 2 | 5 | 4 | means that the first dot of the first row will be fired in pass five, while the second dot of the first row will not be fired until pass six, and so on. Thus the mask is always something that is directly related to the dots on the drawing: each dot (each position in the mask) will have a pass number in which to be fired.

The Restrictions—These are expressed in the form of a matrix, called the constraint matrix. This matrix will have a center point (i. e., the number of rows and the number of columns are odd numbers), which will be called the pivotal point.

The meaning of the constraint matrix is the following. When the center point of the matrix is placed over any position on the mask, this position cannot be fired in the same pass as those neighbors in the mask that are beneath a one ("1") of the constraint matrix.

Consider as an example the constraint matrix that is shown as FIG. 1. Alternative graphical ways of saying the same are

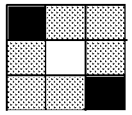

| N | Y | Y |
|---|---|---|
| Y | X | Y |
| Y | Y | N | where the grey squares or those containing a "Y" represent the neighbors that will be taken into consideration, the white square or the one containing an "X" is the pivotal point, and the black squares or those marked "N" are the neighbors that will not be taken into consideration.

Next consider the following mask (the same as before, with eight passes, but now without the center value)

| 5 | 6 | 4 | 7 | 1 |
|---|---|---|---|---|
| 7 | 1 | 3 | 2 | 4 |
| 5 | 8 | ? | 6 | 3 |
| 7 | 4 | 1 | 8 | 2 |
| 8 | 3 | 2 | 5 | 4 | and we want to find a legal option for the center pixel, the one containing a question mark. We would put the constraint matrix with the pivotal point over the position in question, thus getting something like the following.

| 5 | 6 | 4 | 7 | 1 |
|---|---|---|---|---|
| 7 |   | 3 | 2 | 4 |
| 5 | 8 | ? | 6 | 3 |
| 7 | 4 | 1 |   | 2 |
| 8 | 3 | 2 | 5 | 4 |

The grayed numbers (corresponding to the "Y" entries in the previously shown lettered form of the constraint matrix) are the forbidden values. This means that three, two, eight, six, four and one are not legal pass numbers for the center point. The only options are five and seven. It is preferable to choose seven, as five is in the same row just two positions before.

Building the mask—Next will be shown a method for building the halftoning mask or the printmask. This will be done by rows: beginning with the first pixel in the first row, doing all the first row, and so on. If the process has been followed down to the second pixel of the third row, the mask is like

| 5 | 6 | 4 | 7 | 1 |
|---|---|---|---|---|
| 7 | 1 | 3 | 2 | 4 |
| 5 | 8 |   |   |   |
|   |   |   |   |   |
|   |   |   |   |   | and the next value is now to be chosen (in a printmask it is the pass in which the center point will be printed). The first step is to look at the restrictions imposed for the new point. This means superimposing the constraint matrix, in this way:

| 5 | 6 | 4 | 7 | 1 |
|---|---|---|---|---|
| 7 |   | 3 | 2 | 4 |
| 5 | 8 |   |   |   |
|   |   |   |   |   |
|   |   |   |   |   |

The forbidden values for the new point are seen to be three, two and eight.

There are, however, more restrictions. What has just been done is to make sure that the new point will be legal, but there are other points already assigned that must continue being legal! This means that it is necessary now to put the constraint matrix over the neighbor points already assigned, and see what restrictions are imposed by doing so.

Positioning the mask over the one shows that it imposes no restrictions on the central pixel:

|   | 6 | 4 | 7 | 1 |
|---|---|---|---|---|
| 7 | 1 | 3 | 2 | 4 |
| 5 | 8 |   |   |   |
|   |   |   |   |   |
|   |   |   |   |   |

Placing the mask over the three yields:

which requires that the candidate for the new position cannot be a three.

If in like fashion the constraint matrix is positioned over all the neighbors of the central candidate, the values forbidden by the fact that the values already there have to continue to be legal would be seen to be three, two and eight. These are precisely the same conditions previously found for the new value to be legal.

There is, however, a reason other than coincidence for this extremely powerful simplification: the constraint matrix has a certain "symmetry". If the lower right corner were instead a one (shadow) instead of a zero (black), then placing the constraint matrix over the one (see two masks above), would reveal that the one had become a forbidden option. That would mean that the conditions needed to continue to assure the legality of numbers already there would not be the same as the conditions needed to assure the legality of the new option.

This observation has a very important implication, which is a cornerstone of the preferred method: if constraint matrices follow this kind of special symmetry, which will be thoroughly defined below, it is necessary to look at only one set of the conditions to be sure that all the conditions will be satisfied. In other words, the mask can just be constructed in a continuing forward progression without ever looking back and changing the numbers that were put in before.

The entire printmode mask is created in this manner. Actually, a few more complications arise when the mask is tiled—as will be shown in more-complete discussion of the algorithm, below.

2. Definitions

This section and those following may appear complicated at first sight, but no advanced mathematics is required—it is just that the problem involves many variables, and they must be written somehow.

A mask will be defined assigning to each pixel a number representing (in a printmask) the pass in which it will be printed. It will be represented by a matrix called [M]. For example, in the mask of FIG. 2 the number two in the second row means: "this pixel will be printed during a printhead's second pass". Its elements will be referred to as $m_{f,c}$, where f, c have the usual meaning of row, column respectively (both starting at 1).

The restrictions will be defined by a (2r+1)×(2s+1) constraint matrix. This matrix will be called [C], and its components $c_{ij}$, where i, j will not have the usual meaning: they will refer to the distance in rows and columns to the center point as exemplified in FIG. 3. In that matrix, notice that the center point, which will be called from now on the pivotal point, is not defined (it will be defined for constraint matrices relating different colors).

Components of both the mask and the constraint matrix will be a set P of the natural numbers having these useful properties:

a) They have an upper bound, which will be the number of passes, and a lower bound which will be 1. For example, if the number of passes is 4, possible values are 1, 2, 3, 4.

b) They have an internal sum defined in such a way that they "wrap around" at the maximum value. This means that, with the previous set, 3+1=4; but 3+2=5, so it wraps around to be 1.

c) They have a way to define intervals that is consistent with the above definition: the interval [a,b] is the set of numbers that results if, beginning with a, each number is the preceding plus one, until b is reached. In the example above, the interval [2,4] is the set {2,3,4}, and the interval [4,2] are the numbers {4,1,2}.

The closed interval [a,b] includes the boundary values; the open interval ]a,b[ does not.

The meaning of the constraint matrix is: given any particular position in the mask, if the constraint matrix is superimposed over the mask such that the pivotal point is over that particular position, the value in this point of the mask cannot be in the open range defined by the numbers of the constraint matrix on the numbers of the mask that are below them. This definition appears confusing, but the following example will show that the actual application is quite simple.

The constraint matrix is appears in FIG. 4, and the number of passes is eight. The objective is to assign a value of a point on the mask that appears at "?" in FIG. 5. The constraint matrix should be positioned with the pivotal point over that position "?" to be assigned, and the forbidden ranges calculated as suggested in FIG. 6. This means that the forbidden numbers for the new position are, beginning with the first row:

{3}, {4}, {4, 5, 6, 7, 8}
{8, 1, 2}, , {5}
{ }, {3}, { }

It is clear that all the possible numbers are in the forbidden set, so it is not possible to find any number for the new position that satisfies all the conditions. The clean way of defining how the constraint matrix works is as shown in FIG. 7.

An interesting subset of the constraint matrices is those matrices which contain only zeroes and ones. The candidate has to be different than the preexisting numbers where the constraint is 1, and there are no restrictions on the candidate where the constraint is 0.

3. Building the Internal Part of the Mask

Given a matrix of constraints, there are a number of ways to construct a mask that fulfills them. For example, positions could be selected randomly, the constraint matrix placed there, and an effort made to find a "legal" number. This would be easy at the beginning, but would become harder as the mask filled in.

The best way to build the mask is probably by filling it by rows or by columns. This makes it possible to define a certain kind of constraint matrix that will make the procedure easier.

Say we want to construct a mask by rows. We can definitely assign the first number. Let's assume that we have been able to assign values to the mask up to the f,c−1 position, and let's see what restrictions exist for the f, c position. Rather than a demonstration of this for a general constraint matrix, the derivations will be shown here with a small, 3×3 matrix to more simply illustrate the principles and procedure—but the more-general expression is discussed in subsection 9 below.

The constraint matrix will be as shown in FIG. 8, and the state of the mask when the next step is to find $m_{f,c}$ is shown in FIG. 9. Notice that, because the construction process is proceeding row by row, after the question mark that is the point of present interest there is currently nothing.

Given a three-by-three constraint matrix with the usual notation, the restrictions can be segregated into two main groups: restrictions needed to ensure that the numbers already there will continue to be "legal", and restrictions coming from the fact that the new number itself will have to be legal.

Forward compatibility—For the numbers already there to continue being legal, we have to apply the constraint matrix to them and see what restrictions are imposed on the candidate. The result appears in FIG. 10.

In general, each one of the restrictions defines a set of $2 \cdot c_{i,j}-1$ numbers. (For example, if we apply $c_{i,j}=3$ to 5, we find the interval ]2,8[, which does not include its borders, so the set of numbers is $\{3,4,5,6,7\}$). The amount of forbidden numbers to assure forward compatibility appears as FIG. 11.

Backward compatibility—But there are more restrictions: the ones that the new candidate has to satisfy to be legal itself. We can find them by applying the constraint matrix to the position of the candidate, leading to the conditions in FIG. 12. Those are the conditions that assure backward compatibility. In general, they will be different from the preceding ones, defining $n_b$ forbidden numbers seen in FIG. 13.

Now, from examination of all the conditions, it is clear that some restrictions can be imposed upon the constraint matrix that will make the backward compatibility conditions equal to the forward compatibility conditions. Specifically, if we require $$c_{-1,-1}=c_{1,1};\ c_{-1,0}=c_{1,0};\ c_{-1,-1}=c_{-1,1};\ c_{-1,1}=c_{1,-1};\ c_{0,-1}=c_{0,1}$$

then the backward compatibility conditions are the same as the forward compatibility conditions. This means that, with a constraint matrix such as appears in FIG. 15, just imposing backward compatibility will ensure forward compatibility. This kind of matrix will be called "polar symmetric".

4. Building the Last Column

If the mask has to be tiled, the points on the last row and the last column are more constrained—because when it is time to put them in, it develops that their neighbors are the first column and the first row, which have already been assigned. Accordingly, trying to assign a point in the last column of a mask that has to be tiled is equivalent to having a mask such as shown in FIG. 16.

Notice that the subindices c+1 and c+2 have been replaced by 1 and 2, respectively. This produces exactly the same set of conditions as already seen above (but replacing $m_{f-1,c+1}$ by $m_{f-1,1}$), plus two new ones coming from the wraparound: forward and backward compatibility as presented in FIG. 17. Assuming that the matrix is polar symmetric, here $2 \cdot c_{0,1}-1$ new constraints are added.

5. Building the Last Row

Trying to assign a point in the last row is equivalent to having a mask as shown in FIG. 18. The added conditions are for forward and backward compatibility appear in FIG. 19.

Assuming the matrix is polar symmetric, here we add $(2 \cdot c_{1,-1}-1)+(2 \cdot c_{1,0}-1)+(2 \cdot c_{1,1}-1)$ new constraints. The most restrictive situation is that of trying to find the very last point. Then the process is at both the last row and the last column, and all the possible restrictions apply.

6. Defining the Constraint Matrix to Best Advantage

If it is decided to work with polar-symmetric matrices only, then only half of the matrix is actually needed since the other half carries redundant information. If the construction is performed by rows, it is possible to actually have three matrices in one:

The first half defines the construction inside the mask, the second half of the middle row (excepting the pivotal position) constrains the construction in the last column, and the second half of rows (excluding the center row) constrains the construction of the last row. This is shown in FIG. 20. Defining the constraint matrix in this way allows loosening the restrictions for the last row or column without changing the construction of the inside of the mask.

7. Filling in the Values

The discussion to this point has centered on the constraints—but when ready to fill in a certain position, and after having discarded the forbidden values, there are many ways to actually choose the value for that position, from the range of possibilities. Options that are available include:

a) just randomly picking one;

b) assigning to the possible candidates a distribution of probability, that makes it more likely to pick up the ones that are "farther away" from the forbidden values; and c) picking the candidate that is "farthest away" from the forbidden values.

This list is not intended to be exhaustive. The distribution of probability for option "b)" can be linear, or exponentially decaying, or arbitrary, or may follow any number of other functions.

8. Probabilities; Conditions of Feasibility

In trying to fill a certain position in the mask, some sets of numbers will always be forbidden. If the position is inside the mask there will be a certain number of such sets; if it is in the last column the number of sets will be higher; if it is in the last row the number of sets will be even higher.

In general, there will be q different sets, each one with a different number of members $n_i$ as seen in FIG. 21. The notation shown there highlights the fact that all the numbers in a given set are consecutive.

Condition of feasibility—The condition that assures that it will always be possible to find a number different to all those present in the sets is simple: the number of passes nP has to be higher than the total number of constraints as FIG. 22 shows.

Notice that the feasibility can be known just by looking at the constraint matrix and the number of passes. The number $n_i$ of individual constraints will always be related to a value in [C], $n_i=2 \cdot c_{j,k}-1$.

Degrees of freedom—The number of degrees of freedom (or the number remaining) can be defined as the difference between the number of passes and the total number of constraints, when this value is equal to or higher than zero. When the total number of constraints is higher than the number of passes, the number of degrees of freedom remaining is zero.

Overconstrained matrices—If the number of constraints is higher than the number of passes, it is desirable to know the probability of being able to find a number that is not already defined as a constraint. The following rough analysis by the inventors is subject to refinement through stronger understanding of probabilities; however, as will be understood, high accuracy in this regard is not necessary to the general principles of the invention, which have been found valid in practice.

The probability $P_i$ of finding a certain number in the set i is shown in FIG. 23. The probability $P_{i,j}$ of finding a certain number in the set i and not in the set j is shown in FIG. 24, where $n_{i,j}$ is the number of values that belong both to i and to j.

In general the exact value of $n_{i,j}$ cannot be known, but the mathematical expectation (i. e. the average) in the long run can be found as in FIG. 25. (The derivation of this expression is rather lengthy and not necessary for present purposes.)

Thus it is possible to calculate the probability of finding a number in any of the sets by adding the probability of it being in the first set to the probability of being in the second set and not in the first one, plus the probability of being in the third set and not in the preceding, and so on. The probability of being able to fill the position will be one minus the probability just described.

The whole expression accordingly appears as in FIG. 26. Again, remarkably all that is needed to know the probability is the number of passes and the values in the constraint matrix.

All that has been calculated to this point is the probability of being able to find a certain value in the mask. It remains to fill the mask. In general, sets of restrictions will be different for the first column and row, for the inside of the mask, and for the last column and row.

This means that the probability $\Pi_{mask}$ of being able to find the mask will be something like this product:

$$\Pi_{mask} = \pi_{fr}^{V_{fr}} \cdot \pi_{fc}^{V_{fc}} \cdot \pi_{in}^{V_{in}} \cdot \pi_{lr}^{V_{lr}} \cdot \pi_{lc}^{V_{lc}}$$

in which $\pi_{fr}$=probability of filling a position in the first row
$V_{fr}$=number of values in the first row
$\pi_{fc}$=probability of filling a position in the first column
$V_{fc}$=number of values in the first column
$\pi_{in}$=probability of filling a position inside the mask
$V_{in}$=number of values inside the mask
$\pi_{lr}$=probability of filling a position in the last row
$V_{lr}$=number of values in the last row
$\pi_{lc}$=probability of filling a position in the last column
$V_{lc}$=number of values in the last column.

(This expression is an approximation. For greater accuracy, separate treatment should be given the intersection points—i. e. the point that is in the first column and the last row, and so on.)

The overall probability $\Pi_{mask}$ decreases very quickly with the total number of elements V if the probabilities $\pi$ are below unity.

9. Constraint Matrices of Any Dimension

A general polar symmetric matrix appears in FIG. 27. The part 1 defines the constraints for the inside of the mask, part 2 defines those added in the last s columns, and part 3 those added in the last r rows.

The number of constraints, and therefore the degrees of freedom, associated with any one of the zones, is easily calculated just by adding up the ranges associated with all the values of the matrix in the zone. Again, the range is $2 \cdot c_{ij} - 1$.

10. Generating Masks on Demand

Using the fast mask-generating algorithm, masks can be generated by the printer or an associated driver whenever they are needed. This arrangement has several valuable advantages discussed below, including an opportunity to optimize the design for the specific state of the system and characteristics of the image, as well as enabling a huge data compression ratio for some masks (particularly large masks).

Data compression—The algorithm for building masks can be understood as a data-compression algorithm. Masks of highest quality are known to require a significant storage capability, and many of them can be required in a given product.

Through use of the present invention it is possible to store only the core algorithm and the constraints, independently of the size of the finished mask. Typically storage for the algorithm and constraints is a tiny fraction of a large mask size—and an even tinier fraction for the eight to twelve or more large masks commonly required to accommodate several kinds of printing medium, several print speeds and so forth.

The present invention can be used to generate masking for an image even while the image is being printed, and if desired the mask can be a major fraction of the image dimensions. In this case the effective data compression is monumental.

Adaptive error hiding—A printmask also can be generated so that it does not use nozzles that are not working properly, or uses them sparingly and in well-defined conditions, optimizing the usage of the rest of the nozzles. In addition even image type and other dynamic conditions can be accommodated.

Printers with sensors capable of analyzing the "quality" of inkjet pens nozzle by nozzle (such as the optical line sensor used in most large-format printers) should be able to generate printmode masks internally, taking advantage of the current state of the pens. Nozzle quality includes nozzle outs, but extends to weak or misdirected nozzles.

The present invention encompasses weighting the use of individual nozzles. Therefore a designer can straightforwardly derive an auxiliary algorithm which uses the printer's assessment of each nozzle to generate constraints to the principal algorithm described in this document.

These constraints, ordinarily, decrease the weights assigned to weaker nozzles. The printer then runs the algorithm with these new per-nozzle constraints along with the existing general constraints for the printing medium, writing system, etc. to generate a new printmode.

With this approach, and the core of the algorithm in the firmware (it isn't large), printmode masks can be generated internally and dynamically after every pen check, for best output. The writing-system designer should ensure that pen servicing is attempted automatically before falling back to printmode changes.

Additionally, limits should be placed on the minimum number of working nozzles, or minimum weights each nozzle is using, before informing the customer that the pens must be replaced for acceptable throughput or print quality.

Even relatively inexpensive printers can use the present invention to provide error-hiding print modes. For example, employing acoustic drop detection for each nozzle, and the algorithm described in this document, users can be offered the option of extending the effective life of a print cartridge without loss of print quality by using slower, but error-hiding print modes. Some additional considerations follow.

(a) Detailed nozzle state—A list of nozzles that are inoperative ("dead") is straightforwardly used as a constraint to a printmask design. Such an arrangement enables the design process to adapt to known initial nozzle outages encoded into the pen at the factory, and changing conditions of the pen as well.

If the printer is able to detect also misdirected or weak nozzles, as noted above this information can also be used to minimize and condition the usage of these nozzles. This scheme allows a much higher-quality hiding of errors than traditional strategies, which are based on static lookup tables (LUTs) of nozzles to use for backing up each particular nozzle that may fail. There are at least three main benefits:

(b) Mask integrity—The mask retains its texture and other main characteristics. There will be no noticeable loss of quality, as long as there is a chance of backing up the dead nozzles at all. (This process does have limits: if there are enough dead nozzles, no backup is possible; and at an intermediate level of nozzle failures the system throughput may be so low as to disfavor continuing to print, or at least to disfavor starting printout of a new image.)

(c) All able nozzles used for backup—First, in event of a dead nozzle, all the nozzles which are able to back it up can be made to share that responsibility. If a nozzle which might be on a static backup-nozzle LUT also fails, the whole LUT approach is seriously degraded—but with adaptive error hiding the system rearranges all its resources to accommodate whatever combination of failures actually occurs.

(d) Malfunctioning nozzles redeployed—Second, a nozzle that is misdirected or weak but not inoperative can still be used to the extent its condition makes reasonable. For instance such a nozzle may be used with particular weights that disfavor repetitive functioning in consistent positions within a swath, so that the nozzle adds to inking but does not significantly contribute to swath-edge banding.

(e) Job type—In addition, mask generation can be made to depend straightforwardly upon known image characteristics such as a user could enter on the printer console or in a computer interface, or image types such as a printer driver can extract for itself from the types of objects incorporated into an image. A particularly powerful special case of adaptation to job type is discussed in the next subsection below.

Image-dependent masking—Given the ability to build the mask on demand, it can be optimized to better match the type of file to be printed. This capability is not limited to the classical divisions such as commercial graphics, text, and photograph-like continuous tone images such as discussed in the preceding paragraph, but can also be made to depend upon more-sophisticated monitoring of image characteristics by the printer or its driver.

Such design criteria include the activity of the image, and the number of high-density areas. By "activity" here is meant the number of changes per unit area seen in a data stream representing the image.

For example, a picture of a garden with grass typically has a high level of activity, as thus defined—constantly changing along pixel rows or in practically any other monitoring sequence: dark green, then light green, next black, and light green again. A simple green area fill or typically a picture of the summer sky has low activity.

The degree of randomization of a mask has two important secondary effects:

a) The best-known characteristic of a random array is the lack of repeatability of whatever is done with it. If it is used to print, whatever error is present in the printer or pen (misdirections, dead nozzles) will not be applied in a consistent way.

As a result the printing process will not produce regular artifacts. This makes the process very robust in its ability to suppress the conspicuousness of banding.

b) It is perhaps less well recognized that the more random an array is, the more granular it appears. This is almost a natural law, which holds for any array of numbers.

If it were possible to make a completely random array, it would contain areas with similar numbers close together, and areas where they almost no such pairings appear. This has an important implication when such an array of numbers is then used to put dots on paper:

If the system is printing an area fill and the mask is granular, it prints dots very close to each other in certain areas, and far away in other areas. Where the dots are close together, the ink coalesces and stands out from the other areas. This result is called "blotchy".

On the other hand, if the system is printing an area with high activity, even though the inks are still actually somewhat blotchy that effect is not visible. At least it is not conspicuous, as the variation in image details evidently disrupts the coalescence that produces a blotchy appearance.

Thus in the abstract it is desirable to make masks random, but in practice random masks produce blotchy results in area fills. One way to overcome this problem is to change the mask depending on what type of image is to be printed.

A high-activity image is advantageously printed with a very randomized mask, which makes the printout very robust in its resistance to banding. As just explained, using the same mask for an image with high-density, low-activity areas makes the result prone to objectionable coalescence and granularity, and so should be avoided in favor of a less-randomized, lower-granularity mask.

The tendency of highly random masks to appear very granular and to produce highly granular images when used to print midtone area-fill fields can be appreciated by a graphical example. The example will also demonstrate the drawback of a mask that is substantially nonrandom.

Figure 30:
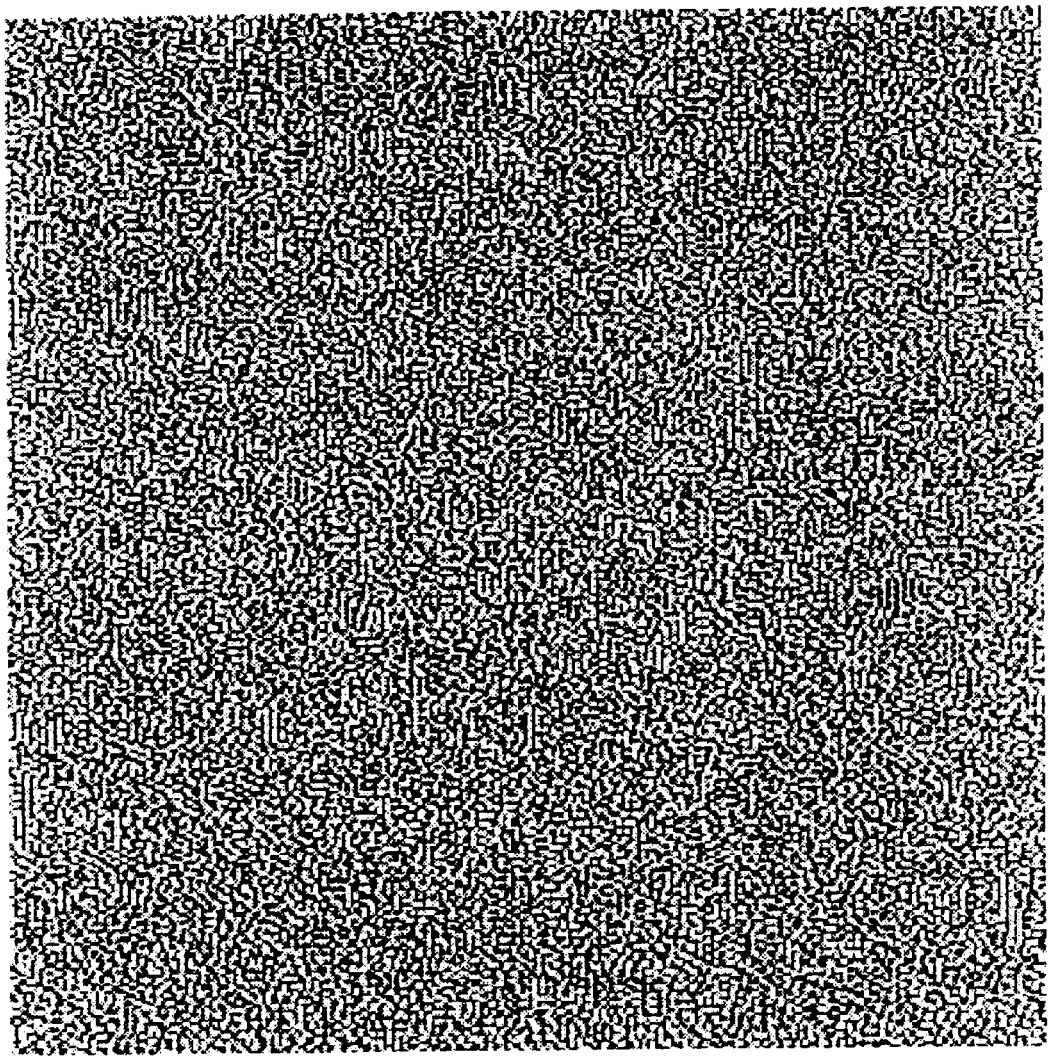
FIG. 30 is a like rendering of a mask made with intermediate degrees of determinism and randomness.
Figure 31:
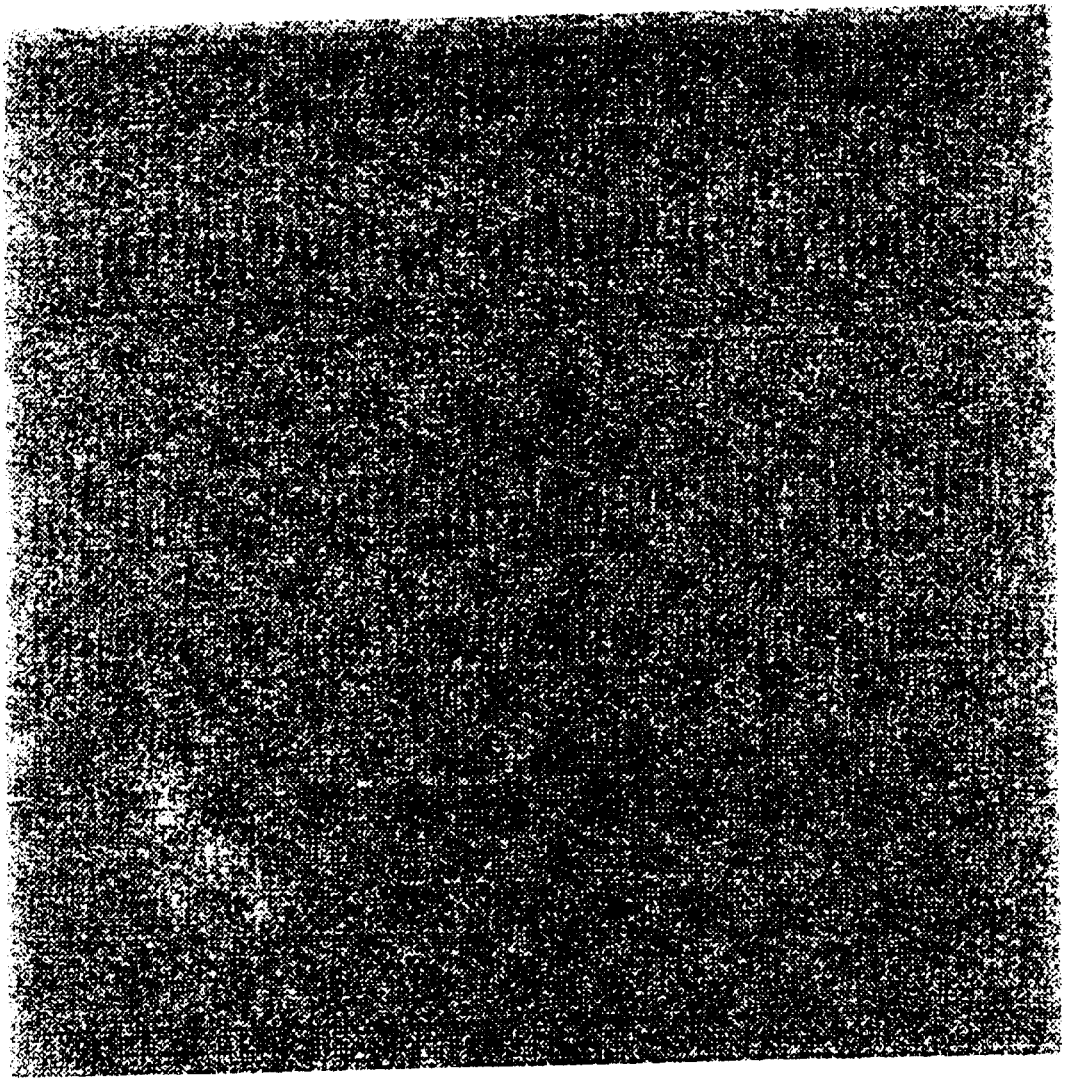
FIG. 31 is a simulation of a printed midtone gray made with the mask of FIG. 28.
Figure 32:
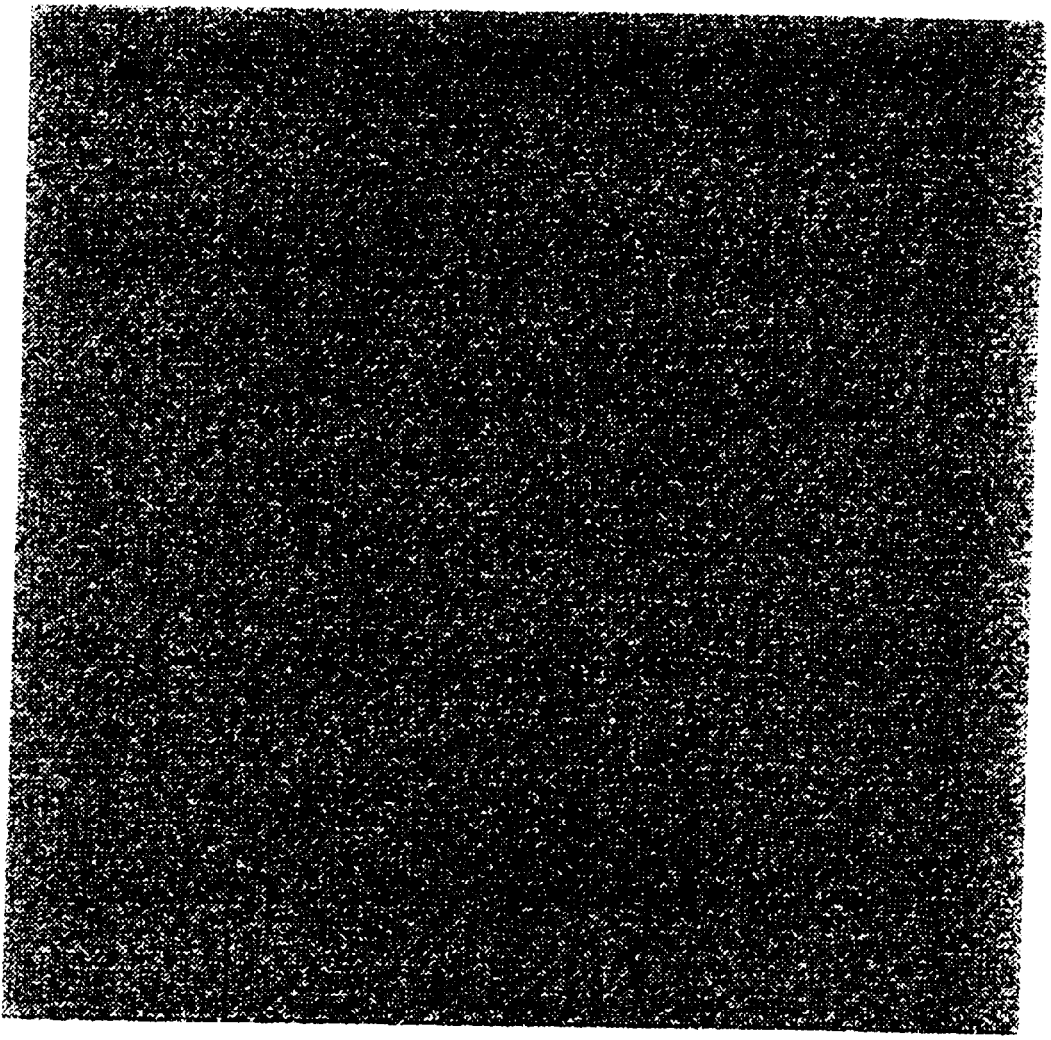
FIG. 32 is a like simulation made with the mask of FIG. 29.

FIGS. 30 through 32 show enlarged abstractions of three 256×256-pixel, 24 pixel/mm (600 dpi) printmasks, in which pass numbers are mapped into distinct respective gray levels. The only difference between these three views is the degree of randomness dialed into the mask-generation process by setting of the constraints as described earlier.

Figure 29:
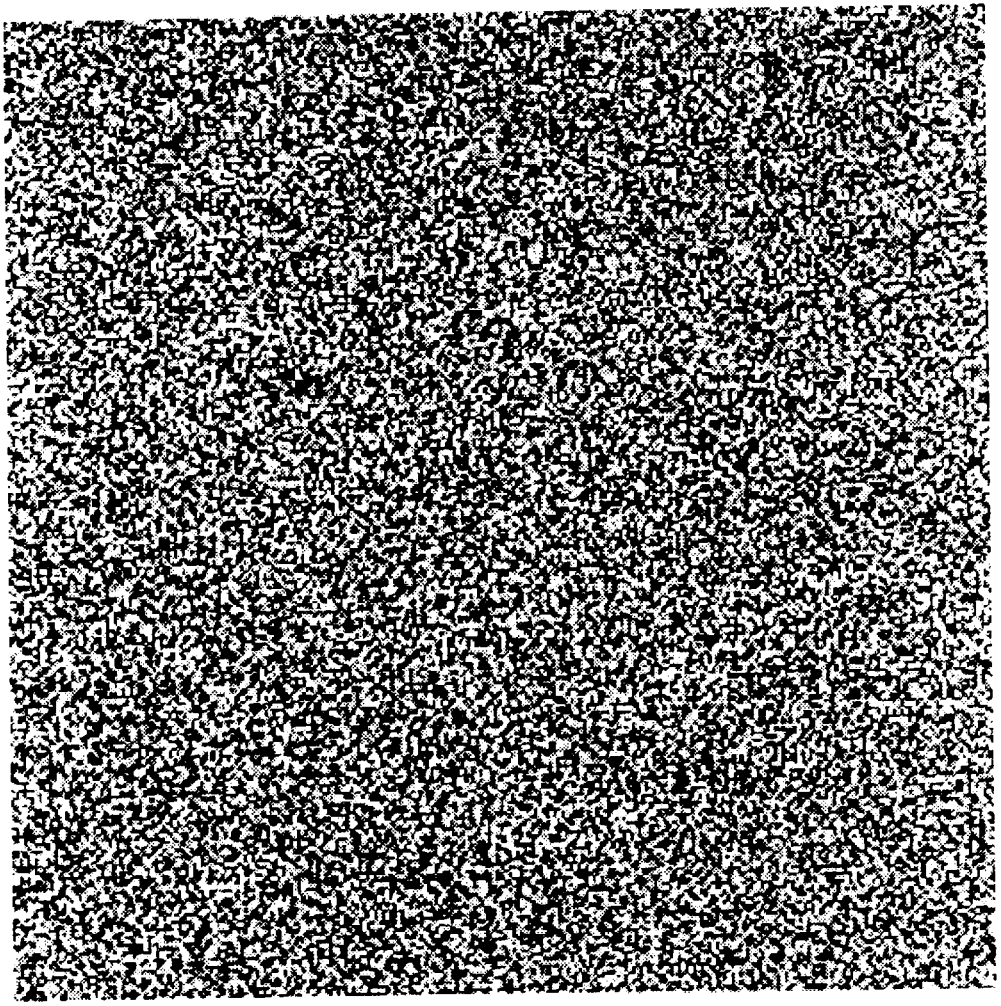
FIG. 29 is a like rendering of a mask made with a high degree of randomness.

Thus FIG. 28 is a conspicuously ordered printmask, FIG. 29 a printmask of high randomness, and FIG. 30 a printmask that is at intermediate point in the determinism-randomness spectrum. The high degree of patterning seen in FIG. 28 is a direct result of the deterministic, repetitive processes that occur in mask-building with the present invention when the constraints are set to minimize randomness.

Figure 33:
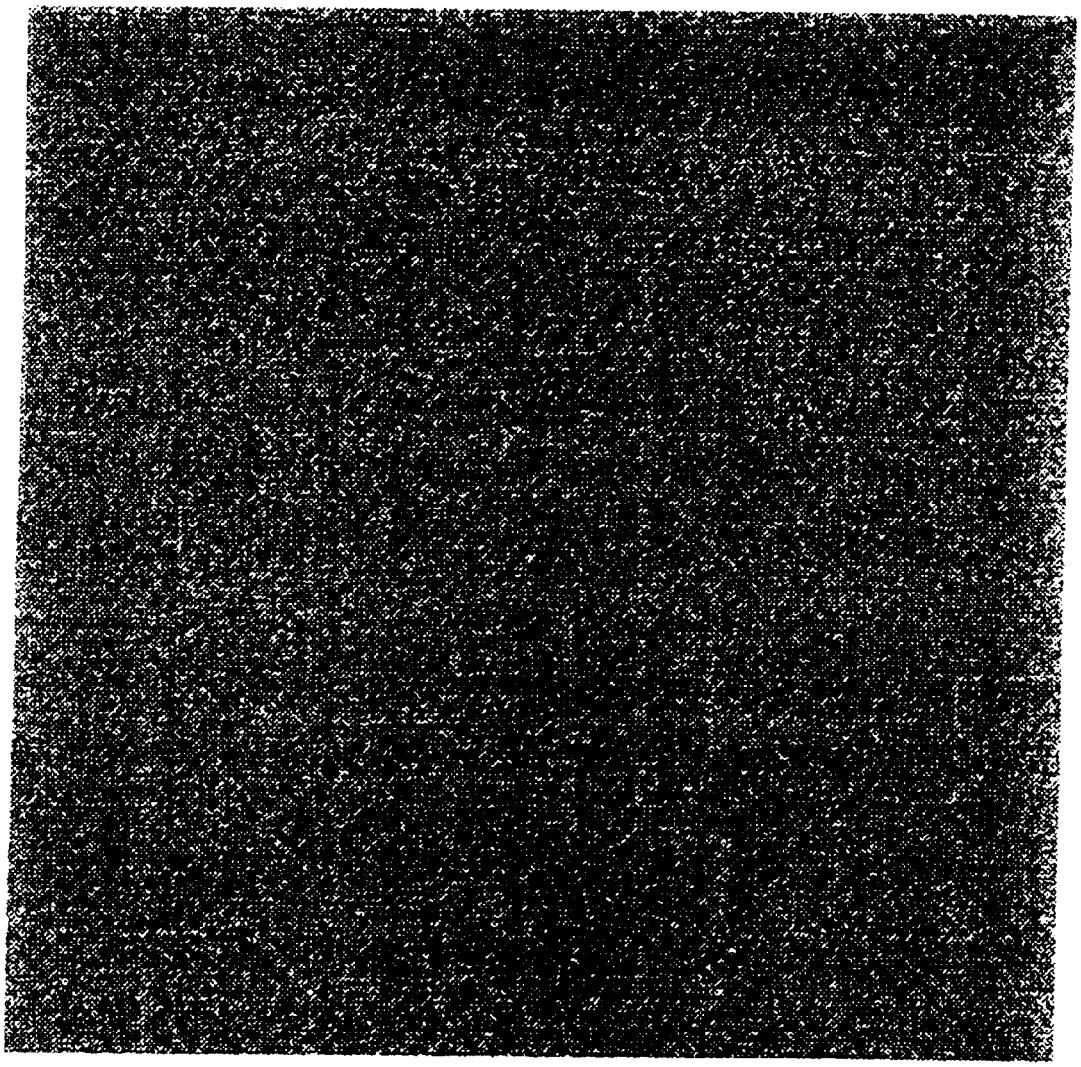
FIG. 33 is a like simulation made with the mask of FIG. 30.

These images are abstractions of numerical characteristics of the three masks, not precisely what is seen when the masks are used to print. The latter can be seen by convolving each mask with a midgray tone, as presented in the enlarged simulations of FIGS. 31 through 33.

The FIG. 28 ordered mask renders a midgray tone that is so strongly and elaborately patterned as to resemble a woven fabric (FIG. 31). The FIG. 29 highly randomized mask renders the same tone with only a relatively residual degree of patterning (FIG. 32).

The latter patterning appears primarily as horizontal sequences of coarse, irregular dark spots. The FIG. 32 view may perhaps resemble a very coarse-fiber carpeting. It is perhaps the coarseness of the dark-spot series or streaks that makes them at all conspicuous, and this coarseness derives directly from the high granularity of the FIG. 29 high-randomness mask.

Rendering the same midgray tone with the FIG. 30 intermediate-randomness mask produces a simulated image that is also intermediate in granularity or coarseness. It may also be intermediate in regularity, but the patterning seems to appear approximately the same as that prepared with the more highly-random mask.

Thus the technique of selecting a middle ground between randomness and order yields an overall result that is doubly favorable, in having both relatively small granularity and at least relatively inconspicuous patterning. As noted above, however, an objective of this technique is to match the randomness level to image characteristics, and the image thus optimized in this case is one of essentially zero activity; for a high-activity image, a much more random mask would be better.

11. Optimally Sized Masks

Mask height greater than print-medium advance—The traditional design of masks has made them smaller than the printing-medium advance distance, and their height is typically an exact divisor of the advance. Making masks larger than the medium advance, in particular making printmasks the size of the pen or larger, has been shown to significantly improve the robustness of the system in its resistance to banding.

In first implementations, a ten-percent increment (from eighty to ninety percent) of good plots in system testing was observed. That improvement was found using a very preliminary version of the algorithm, and with a mask that was much smaller than used now. Present implementations appear able to do roughly the same while also enjoying a throughput increase of about twenty-five percent.

Optimal-width masks—The human vision system is particularly sensitive to certain spatial frequencies (or more precisely angular frequencies), and loses sensitivity outside this range. Viewing distance plays an important role: up to a certain distance human eyes can see minuscule defects, and beyond this distance such defects are less visible.

It has been shown that making a printmask width between 1¼ and 2½ cm (one-half and one inch) gives optimum banding-concealment performance. If masks are smaller, the repetitive pattern falls into the range of frequencies that are easily perceived by the human eye.

If masks are bigger, remarkably enough, little additional benefit is achieved. This discovery is extremely valuable as it enables restraint of mask sizes at about 2½ cm without significant loss of quality.

It will be recalled that intuitively those skilled in the field would expect significant benefits from mask sizes ascending to a major fraction of a full-page image width. Thus the observations described above yield a surprising and powerful result.

Humans have typically a very strong response to stimuli varying at about five cycles per degree, which corresponds to roughly 1.2 cycles per millimeter (thirty cycles per inch) when viewed from 250 mm (ten inches). At only modestly increased frequency, up to eight cycles per degree, the response is only about ten percent of that at five cycles.

Considering the response to fall off comparably at lower frequencies, and geometrically, at about 0.04 cycles per millimeter (one per inch) the response is extremely attenuated. If a person looks at a 0.04/mm pattern close up (assuming ability to focus at short distances), individual defects may be quite visible, individually—but, because the repetitive character is lost at the lower angular frequency in the close-up view, the defects tend not to appear noticeable as a pattern.

Resolution relation to mask size—In accordance with the above discussion, optimum printmask size must be stated in terms of printed physical size, and therefore may be seen as dependent on the printing resolution. More precisely, in terms of absolute dimensions the mask size is independent of resolution—but if it is defined in terms of pixels the optimum mask size varies generally with resolution.

If the printing resolution is 24 pixels/mm (600 dpi), a mask that is 512 bits wide will be approximately optimal in size. If the printing resolution is 47 pixels/mm (1200 dpi), the same quality will be achieved with a 1024-bit mask.

12. Nozzle-Modulated Printmasks

Ramp-down of nozzle usage at pen extremities—Defining a ramp of nozzle usage at the end of the pen that first reaches the printing medium has been shown to significantly improve the quality of the output on many media. If P is the height of the medium advance, expressed in nozzles, the ramp is typically made to extend over a number of nozzles equal to or smaller than P.

Within that condition, selection of the ramp length is readily determined by limiting the ramp to those nozzles that will find the printing medium moderately dry. Beyond that point the image-quality significance of partial vs. full inking tends to be attenuated, because small additional increments of ink are less conspicuous on an already damp sheet.

Best results are often achieved with linear ramps, with the first nozzle printing perhaps only one percent of its normal usage. The Pth nozzle prints one hundred percent of the normal usage, and the intermediate nozzles follow a linear scale between those two percentages.

Other ramp patterns such as quadratic, cosine, or arbitrary monotonic can serve as well. In any event, preferably the remaining (i. e. central) nozzles print slightly over one hundred percent to make up the dots not printed by the first nozzles.

Different weighting schemes may be used for different media. Some media accept the ink so well that the result almost always look good regardless of weights. Other media simply change their properties when they are wet, so that the second pass in a given area looks different from the first. Many intermediate behaviors are seen also.

Defining a usage ramp with the leading nozzles allows a smooth transition between passes, instead of the abrupt transition that occurs in previous approaches, and so is less prone to banding. In principle the invention encompasses ramping the usage of trailing nozzles as well.

In practice, however, the leading edge of a pen finds the printing medium dry, while the trailing edge often fires over an ample amount of ink already deposited. Experimentation has suggested that more-important improvement can be achieved by ramping at the leading edge.

Sawtooth modulation within the nozzle array—This is another good way of modulating the usage of nozzles. It can be especially advantageous in decreasing the usage of the most important so-called "seam nozzles", which are the first nozzles to touch the media and each group of nozzles that is near a multiple of the paper advance.

Among these, the most important are generally the first three groups: the first to touch the media, the nozzles near P and the nozzles near 2P. Strictly speaking, however, the modulation need not be periodic—and in fact some advantages may be gained through use of a spatial variation that is arbitrary, or random-appearing, or both, or that superimpose these characteristics upon a generally periodic variation.

Wavy seam—Another strategy for nozzle modulation that reduces banding consists of using the nozzles unevenly along the width of the mask. This approach can be implemented in a variety of ways.

For example, masks can be designed to vary the usage of only the first nozzles to fire ink on the medium, compensating for this uneven coverage throughout the rest of the mask. Alternatively the final nozzles to print on the medium can be made to compensate exactly for the variation of the first nozzles, or these trailing ones can be made to vary independently.

More specifically, consider a six-pass printmode mask, 500 pixels square, and assume that the bottom of the mask maps to the nozzles that will fire ink first on the medium. Consider dividing the bottom one-sixth of the mask into N sections along the horizontal (scan) axis, instead of treating this area uniformly as in a conventional mask.

If the density in these N sections alternately increases and decreases around the nominal one-sixth density it should have (for a six-pass mode), the pattern it forms on the medium appears less regular and is less obvious to human observers. The remainder of the mask can be made to compensate for this variation, or alternatively the last one-sixth of the mask can be given the same form of variation—exactly offset from the first.

Virtually staggered Pens; separated seams—Printmode masks can be generated so that all the pens do not use the same nozzles, in such a way that the printable area for a given pass is partially or completely different among pens. The objective is to separate the seams of the different passes for the different colors, to reduce conspicuousness of banding and ink-to-ink interactions.

The offset between each pair of pens can be from just a few nozzles to one full advance. This scheme reduces the hue shift considerably, particularly when printing bi-directionally.

13. Accommodation of Other Algorithms

The present implementation of the invention includes a program prepared in the well-known computer language called "C++". The program has been dubbed "shakes".

It establishes an automatic method for generating and employing printmasks, using a self-standing input text file—called an "NSP file"—of mask constraints, and also using a printmask-generating control algorithm. Although originating in programmers' humor, for present purposes the acronym NSP may be taken as representing the phrase "Neutral Specification Protocol". The control algorithm uses the information in the NSP file to guide generation of a mask.

Thus shakes is in a sense an interpreter of a language called "NSP" that is used to represent what a writing-systems designer expects from the mask that is going to be built. All the constraint syntax presented in this document is NSP syntax.

The program automatically reads the self-standing input text file to accept the constraints contained in the file, and it automatically accepts a definition of a printmask-generating control algorithm. It will be understood that some modular control algorithm—i. e. a definition of such an algorithm—is functionally interconnected with the accepting step.

The control algorithm is modular, in the sense that it can be removed (or the program instructed to disregard it) and another algorithm substituted. The algorithm applies the mask constraints.

As suggested by the phrase "control algorithm", the function of the algorithm is to control other portions of the program that contain the mechanics of a fundamental procedure for generating a mask. In other words, it may fairly be said that portions of the program other than the control algorithm "know how to read the input file" and also "know how to generate a mask."

The program, as distinguished from the control algorithm, automatically generates a mask, under control of the control algorithm. It is significant to the most highly preferred embodiments of the invention that the high-level numerological strategies of the control algorithm are thus isolated or decoupled from low-level mechanics of operating the mask-generating procedure.

What makes this decoupling significant is that it enables wholly different analytical or relational modules to be plugged into the program, including some that have been so far developed by the inventors and discussed in this document—and also including others that may be connected in place of the ones so far developed. This can be done without any necessity for reformulating the portions of the program that read a constraint file or handle low-level mask-building mechanics. In effect the system can instantly accept a cerebellum transplant while continuing to carry on basic processes with an original hypothalamus.

One particularly important class of such alternative analytical/relational modules is the assignment of the self-same program to generation of either printmasks or dither masks. The program can be made to do either, selectively—depending merely on the contents of NSP files that are invoked, and operation of a small number of corresponding software switches to control what the system does with the output masks.

The shakes software uses C++ classes. A "class" in C++ is an amalgam of data and functions that act on that data.

Classes provide a mechanism for adding functionality by use of new classes that are said to "inherit" from existing classes. In shakes, for instance, there exists a mask class, with functions that apply constraints to the mask data, or return the mask size, and so on.

Shakes has two base classes, entitled NSPbase (FIG. ) and basicMask. Each box in the drawing is a class; a class with an outward arrow pointing at another class is said to be the "parent" of that other class. The arrows themselves also signify the inheritance of properties or characteristics from the parent.

NSPbase defines the idea of a syntactical construction that could be found in an NSP file, and what to do when you find it. For example, a syntactical construction might be:

matrix sample_matrix $$\begin{Bmatrix} 0 & 2 & 0 \\ 1 & X & 0 \\ 0 & 0 & 0 \end{Bmatrix}$$

endMatrix

An NSPbase object understands that there is a unique word that defines its start and end, in the case above, those words would be "matrix" and "endMatrix."

NSPbase, however, is an abstraction; it provides no functionality for doing anything with objects it reads. From NSPbase inherit (note its two outbound arrows) the abstraction of a top-level weighter and a top-level mask. By "top-level" is meant that these objects appear as such in the NSP file; they are not contained within any other object.

The only kind of top-level weighter is a "matrix," as shown earlier, and corresponding to the NSPmatrix class in the drawing. This allows the user to use one matrix while constructing several masks.

Top-level mask objects are where there begin to appear what may be called "hooks" for connection of modular objects such as discussed above within the present section. As the drawing suggests, there is the general idea of a mask; in practice a mask has a width, height, number of passes, and the ability to read and write to its data.

From "basicmask" comes "NSPuserMask", and then the specifically implemented NSP syntactical constructions "greedyMask" and "evalMask." The "evalMask" class provides the idea of evaluating a generated mask for its compliance with the specified constraints.

From this in turn comes the "optiMask" class, which uses an evaluation algorithm of evalMask—in conjunction with exploratorily developed changes to the generated mask—to look for ways to improve that originally generated mask.

A first category of "hooks" is thus the NSPuserMask class, from which the currently used greedyMask mask generation algorithm inherits. The greedyMask algorithm relies principally on spatially oriented constraints.

As will be clear from the foregoing, shakes was designed for the idea that other classes could inherit from the NSPuserMask class. The first applications of this potentiality are other mask-generation algorithms.

A second category of hooks is the evalMask class. In a manner analogous to inheritance of mask-generation algorithms from NSPuserMask, a variety of mask-optimization algorithms can inherit from evalMask.

Exemplary of a third category of hooks, at the smallest scope and within the greedyMask algorithm specifically, new kinds of weighters can be added to this algorithm. At present, the greedyMask algorithm can consider the values of cell neighbors, the relative quality of the nozzle that would be used for the current cell, the distribution of nozzle usage, and several other factors.

Nevertheless, shakes is also well prepared for the idea of adding a new weighter (a NSPuserWeighter class exists to enable this) to the greedyMask algorithm. Indeed, greedyMask began with only the matrix weighter, and now includes at least eight ways to affect its behavior.

These include the keywords "matrix", "constraint", "list", "nozzlesDistr", "parityMatrix", "compensate", "random" and "rotate". (Certain of these are established in the "mask" top-level syntactical construction.)

Bearing in mind these ideas about the built-in adaptability of shakes to variants, the sections below discuss several such variants—including not only dither masking but also optimization of already-completed masks and generation of composite masks. Also discussed is a variant that is ideally implemented through a somewhat greater degree of program modification, namely on-the-fly mask generation.

14. Accommodation of Second-Pass Optimization

In like manner, preferred embodiments of the program aspects of the invention have been made to accept a modular printmask-optimizing control algorithm. Such an exchangeable module receives a fully-generated printmask as an input.

The optimizing control algorithm reprocesses that received printmask to substantially optimize it for image quality. The term "substantially" is used here to allow for the fact that optimization is actually in itself a relative concept, in which quality is traded off against time and expense at some rational rate of exchange.

This optimization process is enabled by the presence of its parent, the evaluation algorithm. As suggested above, the optimization procedure exploits the evaluation algorithm as a tool—i. e., its assessments are used to determine what progress and eventual level of success are achieved by the optimization.

15. Composite Printmasks

This part of the invention entails a more general approach to the building of a printmask, for printers that have to put more than one drop in a pixel. In most passages of this document, this kind of mask will be called a "composite" mask rather than a "multidrop" mask, because there seems to be no general agreement, in the art, on the meaning of "multidrop".

This discussion relates to strategies that allow a computer program to build a printmask that fulfills certain requirements, and the concepts underlying them. It is assumed that the designer knows what requirements the mask is supposed to fulfill. In practice, rules for a good printmask range from relatively straightforward ones, such as making sure that a pen will not exceed its maximum firing frequency, to more esoteric ones such as not having certain neighbors firing at the same time.

Discussion here will begin with additional development of the concept of a weighter, basic for the further generalizations needed, and then progress through use of the weighter to build single drop and composite print masks. Syntax proposed to represent different kinds of weighters will be presented as needed.

Weighters—In comparison with making masks that fulfill "hard" restrictions (such as "two horizontal neighbors cannot be fired in the same pass"), a softer and more general way to express the desired characteristics of masks the weighter. Loosely speaking, a weighter is any criterion that can be applied to a mask to rate how favorable a given candidate pass number is for a given pixel position.

The associated concept of a weight, as previously indicated, is a number ranging from 0 to 1 that measures how good would a candidate be in a certain position of the mask. This number is meaningful primarily when compared with the weights for other candidates; it is a relative score.

Moreover the favorability expressed by a weighter is neither precise nor fully objective. The weight is just a means for measuring a preference from the designer, defined by a certain criterion or combination of criteria.

Thus the weighter is a formalization of a criterion that assigns weights, relative preferences, to all the candidates for a given position. There are different parameters that the criteria can be based upon: the character of existing neighbors of the subject position, the localization of that position with respect to the beginning of the drawing, the nozzle that would have to print the pixel for each candidate—and even the values in relative positions of another mask.

A weighter assigns weights to all the candidate pass numbers. For example, in an eight-pass print mode, a weighter should be able to assign weights to the numbers one through eight for any given position in the mask.

Combining weights—In many cases more than one weight is assigned to a given candidate, either because there more than one weighter is applicable or because one weighter is assigning more than one weight (an example will be offered below). In these cases, preferred forms of the present invention use an algorithm for combining the different weights into one number, because the final decision on the candidate relies on having just one weight for each candidate.

This is not a necessary restriction. It is possible to develop algorithms that use many weights for each candidate, and do not suffer the loss of information inherent to consolidating a number of weights into just one.

The present invention combines weights by averaging them, with the exception of the weight "zero": if a zero is present in the list of weights for a given candidate, the combined weight is zero no matter what the other weights may be. If there is no zero, the combined weight is the average of weights.

EXAMPLE

Neighborhood Constraint

A generalization of the constraint concept will be introduced here in order to illustrate the idea of weighter. The neighborhood constraint will assign weights to the candidates depending on the distance in number of passes to a value already present in any given neighbor. For instance, in NSP format:

```
constraint name
    default 1.0    # All candidates are welcome by default
    (-1,0)         # previous pixel in the same row
        [0:0.0]    # Values at a distance of 0 in number
                   # of passes (equal values) are forbidden
        [1:0.1]    # Values at a distance of 1 in number
                   # of passes weighted 0.1 (not desired, but
                   # accepted)
    (0,-1)         # the neighbor one row up
        [0:0.5]    # Equal values weighted 0.5
endconstraint
```

This weighter will assign a weight to all possible candidates, for any given position, taking already present neighbors into account. This constraint can be applied to the shaded, empty position of the following mask.

| 5 | 6 | 4 | 7 | 1 |
|---|---|---|---|---|
| 7 | 1 | 7 | 2 | 4 |
| 5 | 8 | ░ | 6 | 3 |
| 7 | 4 | 1 | 8 | 2 |
| 7 | 3 | 2 | 5 | 4 |

The previous pixel in the same row is assigned to pass eight. This means, applying the constraints defined for (−1,0), that eight will be weighted zero, and seven and one (both at a distance between one and eight inclusive) will be weighted 0.1.

The upper neighbor is seven. Applying the constraint defined for (0,−1) will give a weight of 0.5 to the candidate seven. But there was already a weight for the seven, so a combined weight has to be calculated. None of them is zero, therefore an average is acceptable. The list of candidates after weighting is:

[1:0.1], [2:1.0], [3:1.0], [4:1.0],

[5:1.0], [6:1.0], [7:0.3], [8:0].

The final meaning of those numbers is: eight is a forbidden candidate; one is the worst choice between the legal options; seven is better than one; and two, three, four, five and six are all preferred choices. The function that picks a value chooses randomly between these equally preferred choices.

The constraint matrix as a weighter—The constraint matrix presented earlier in this document is a subset of the neighborhood constraint introduced just above. It can be regarded as a weighter in which every weight is either 0 or 1.

It has been retained as a legal weighter because, even though all that can be done with a constraint matrix can also be done with a neighborhood constraint, the constraint matrix provides a more concise and graphic way of representing restrictions. The syntax proposed for the constraint matrix is:

matrix name
$$\begin{pmatrix} 0 & 0 & 1 & 0 \\ 0 & 1 & 2 & 1 \\ 1 & 1 & X & 1 \\ 0 & 0 & 1 & 0 \end{pmatrix}$$
endmatrix Here the X represents the pivotal point of the matrix.

Building a flat mask; quality of the mask—Flat masks are those in which just one drop is to be printed for each pixel. This is the case of the mask for one color in a noncomposite printer.

Here is a way to build such a mask: begin at the upper left corner of the mask, and fill in row by row. For each position, let all the weighters assign a weight to each candidate.

Each weighter will be multiplying the weights it is supposed to assign by a relative weight, also defined by the user, that represents the relative importance of a weighter with respect the other weighters acting. When all the weights have been assigned to each candidate, they are combined into one weight per candidate.

After that, the choice can be made, for which a couple of options are implemented. One is picking the candidate with highest weight (if more than one has highest weight, randomly pick one among them). The other option is using the weights as probabilities and picking one in such a way that the probability of being chosen is the weight.

Once a candidate has been chosen, its weight is a good measure of how good the option is. Therefore, averaging the weights of all the candidates chosen while building a mask is a measure of how good the whole mask is.

In other words, given a certain set of weighters, the best mask is the one that, when applying the weighters to all its values, will give a highest average. This average will be called quality of the mask, and it is meaningful only referred to a certain set of weighters.

Being able to calculate a quality for the mask is very important for the previously mentioned feature of optimizing the mask generation. Given a measure of how good a mask is, it becomes possible to find algorithms that will optimize it.

Syntax for the mask declaration—One example of a very simple syntax for defining a mask is

```
mask name
    define {
        size (32, 240)
        passes 8
    } with {
        weighter1  1.0
        weighter2  0.8
        ...
    }
endmask
``` in which weighter1 and weighter2 are names of weighters defined before in the program. The number after each name (i. e., 1.0 or 0.8) is the relative weight between them. That is, here the designer is giving more importance to weighter1 than to weighter2.

Using a flat mask as a reference while building another mask—It will now be clear that more than one weighter can be acting while building a flat mask; it is also important to note that some of those weighters can be "looking" at other masks rather than the one being built. As an example consider a mask, that can be either read from disc or just built. The mask is:

| 5 | 8 | 6 | 1 | 2 |
|---|---|---|---|---|
| 3 | 1 | 5 | 4 | 8 |
| 6 | 5 | 4 | 7 | 5 |
| 1 | 3 | 7 | 2 | 6 |
| 5 | 8 | 1 | 6 | 3 |

It has been built to satisfy the constraint matrix:

matrix *matr1*

$$\left\{\begin{matrix} 0 & 0 & 1 \\ 0 & 1 & 1 \\ 1 & 1 & X \end{matrix}\right\}$$

endmatrix

The syntax used for building it has been:

```
mask magenta
     define  {
              size (5, 5)
              passes 8
     } with  {
              matr1  1.0
            }
     endmask
```

Consider that this first mask is, for example, the mask for a magenta pen. Next assume that it is desired to build a mask for a yellow pen, and that the yellow-pen mask should fulfill the same constraints that the magenta mask does—but also that it is not to fire at the same time that the magenta pen fires, and furthermore that no pixel of the yellow mask is to fire when the upper neighbor has been fired by the magenta.

All these "desires" can be expressed as: the mask has to fulfill matr1 applied to itself, and the following neighborhood constraint applied to the magenta mask:

```
constraint crt1
default 1.0
(0, 0)   [0:0]
(0, −1)  [0:0]
endconstraint
```

The syntax for declaring the yellow mask would be:

```
mask yellow
     define  {
              size (5, 5)
              passes 8
     } with  {
              matr1  1.0
              crt1  1.0 to magenta
            }
     endmask
```

A resulting mask is:

| 6 | 1 | 4 | 2 | 7 |
|---|---|---|---|---|
| 2 | 4 | 3 | 8 | 4 |
| 8 | 3 | 1 | 5 | 3 |
| 5 | 6 | 8 | 4 | 2 |
| 7 | 2 | 3 | 7 | 1 |

At this point a representative next step would be to build a mask for a cyan pen that fulfills matr1, crt1 applied to magenta, and crt1 applied to yellow.

It has been suggested that applying a neighbor constraint to a different mask is useful not only for restricting a mask with the values of the reference mask, but also to "copy" another mask. Suppose for example, that a neighborhood constraint such as

```
constraint crt2
default 0.1
(0, 0)   [0:1.0]
endconstraint
``` is applied to the magenta mask as reference for building another mask. What it will do is consider the values in the reference mask as preferred choices: it will copy it.

It may not be worthwhile to copy the particular mask discussed as an example above, but this same procedure can be applied to a mask with a certain desired texture as reference. It is possible, then, to make a mask that fulfill certain restrictions, on one hand, and will try to copy a desired texture, on the other.

Rotating masks—A very simple technique to produce a mask from a reference that will never fire at the same place that the reference mask does is "rotating" the reference; this is, adding a constant using modulus arithmetic to all the values of the reference mask.

Low density masks—It is known to use a mask that produces densities of ink different from one hundred percent. For example, in certain cases it is useful to print just ninety percent of the pixels, leaving the others blank.

The current invention provides a new way to do this, namely by using a reference mask as a dithering matrix, and decide whether or not to print a pixel depending on the value in the dithering matrix. A zero in the mask will mean not to print the pixel.

This reference mask can be of any size, and any number of passes; and any dithering matrix can be used. The syntax used is

```
mask notFull
     define  {
              size (5, 5)
              passes 8
     } with  {
              matr1  1.0
              crt1  1.0 to magenta
            }
     density 90 with dither
     endmask
``` in which dither is a mask that has probably been read from disc. The building of masks of more than one hundred percent density will be explained below.

Composite masks—These are masks in which more than one drop can be printed for each pixel. This is the case of the mask for one color in a composite printer.

A composite mask will be made by adding up different flat masks, that will be called layers. The way it works is simple: when just one drop is to be printed in a certain pixel, the printer looks at the first layer and will find there in which pass the drop has to be fired. When two drops have to be printed in a certain pixel, the printer will look at both the first and the second layers and will fire at the two pass numbers found there.

The ability to build flat masks constrained by other flat masks is crucial for building a composite mask. The preferred strategy is: build the first layer (or "plane") with whatever constraints it has to fulfill; then build the second layer, with the desired constraints it has to have by itself, and the constraints that it has to respect related to the first layer.

The third layer will have to fulfill interlayer (or "interplane") constraints with the first two layers. Such interlayer constraints are commonly related to physical limitations of the printer. For example, most printers cannot fire two drops in the same pixel in the same pass; this condition directly translates to a neighborhood constraint that all the layers must fulfill between them.

This approach is reasonably general, and with the weighters already implemented enables the building of masks for composite printers. One weighter that should be added to the arsenal, and which is readily implemented, is this: given a number of flat masks, keep the number of times that a pixel is fired in the same pass under a stated maximum value.

As the complexity of a mask-building task increases, satisfactory solutions become more difficult to find. It is easy to build a four-layer printmask that will not fire the pen more than once in the same pass, and that will also fulfill simple constraints if it must be printed in eight passes—but if the number of layers too is eight, there will not be many choices for the last layer.

Syntax—In the present invention, the syntax implemented for building a composite mask is just an "addlayer" command. For example, to build a two-layer mask from the example masks discussed previously, the NSP syntax is

```
mask compositeExample
    addlayer
        magenta
        yellow
endmask
``` and the output would be (this time, I present the result with the format we are actually using):

```
size (5,5)
passes 8
layers 2
5 8 6 1 2
3 1 5 4 8
6 5 4 7 5
1 3 7 2 6
5 8 1 6 3
6 1 4 2 7
2 4 3 8 4
8 3 1 5 3
5 6 8 4 2
7 2 3 7 1
```

Example NSP file—Here is a specimen of a simple text file for use in defining mask requirements:

```
#     Mask Definition Language (NSP) Example

# WEIGHTERS

# This is the old constraint matrix. The name will be "matrix",
# in order to distinguish it from the new constraint concept,
# explained below, which does not have a matrix form. The matrix
# does not really accept weighting: it will just put 0 or 1.
# It can be thought as a shorthand for the generalized constraint.
matrix matr1
    { 0 0 0 0 }
    { 0 0 1 0 }
    { 0 0 2 1 }
    { 0 1 X 0 }
    { 0 0 0 0 }
```

```
endmatrix
# This is the extension of the constraint matrix. It is possible to
# assign a set of weights to any neighbor.
constraint crt1    # The name is mandatory
    default 0.1
    (-1,0)         # The previous pixel in the same row:
        [0:0]           # equal values (difference = 0) forbidden
        [1:0.8]         # values within a distance of 1, weighted 0.8
        [4:0.1]         # values within a distance of 4, weighted 0.1
    (0,-1)         # The upper neighbor:
        [0:0.0]         # equal values weighted 0.1
endconstraint
constraint crt2
    default 1.0
    (-1,-1) [0:0.2]
    (-2, -2) [0:0.1]
endconstraint
constraint intermask
    default 1.0
    (0,0) [0:0]        # no equal values in the same place
endconstraint
# Read the dithering matrix for less than 100% density from disc
mask dither
    read dither.pgm
endmask
# The first layer is read from disc
mask firstLayer
    read maskOrg.pjm
endmask
# The second layer is built upon the first
mask secondLayer
    rotate firstLayer 5
endmask
# The third layer is actually filled following some constraints
mask thirdLayer
    define {
        size (16, 15)        # (X, Y) ->(Columns, Rows)
        passes 8
    } with {
        intermask 1.0 to firstLayer
        crt2 1.0             # if the "to" command is missing,
                             # the weighter will apply to the
                             # mask being defined
        matr1 1
    }
    # Following commands are optional in the building of
    # the mask. They control seeds, and different options that
    # give different textures for the same constraints.
    #getseed prb.seed
    putseed prb2.seed
    #passwrap             # pass number 5 plus 4 gives 1 in an 8 pass
                          # print mode
    #random               # use weights as probabilities
    compensate 1.0        # compensate the odds of less favored choices
    #density 25 with dither
endmask
# Build a composite mask from the layers already defined
mask maskAll
    addlayer
        firstLayer
        secondLayer
        thirdLayer
endmask
# Output it to disk in different formats
output maskAll to maskAll.pjm
output maskAll to maskAll.pgm in pgm
output maskAll to maskAll.pnm in nozzles 240 40
```

16. Design of Composite Printmasks

The discussion next proceeds to a general notation for composite printmasks, and a method for applying the constraint-matrix analysis.

Notation for composite masks—The notation for the mask is an extension of the notation for single-drop masks. In a single-drop mask, each pixel is associated with a number that represents the pass number in which that pixel is to be printed. In a composite print mask, this single number is replaced by a triangular array of numbers within a square matrix—or, as a verbal shorthand, a "triangular matrix"—that will be called a "cell".

The cell defines which passes will print for each amount of drops to be fired. The number in row 1 of the triangular matrix is the pass number that will fire if just one drop has to be printed.

Figure 34:
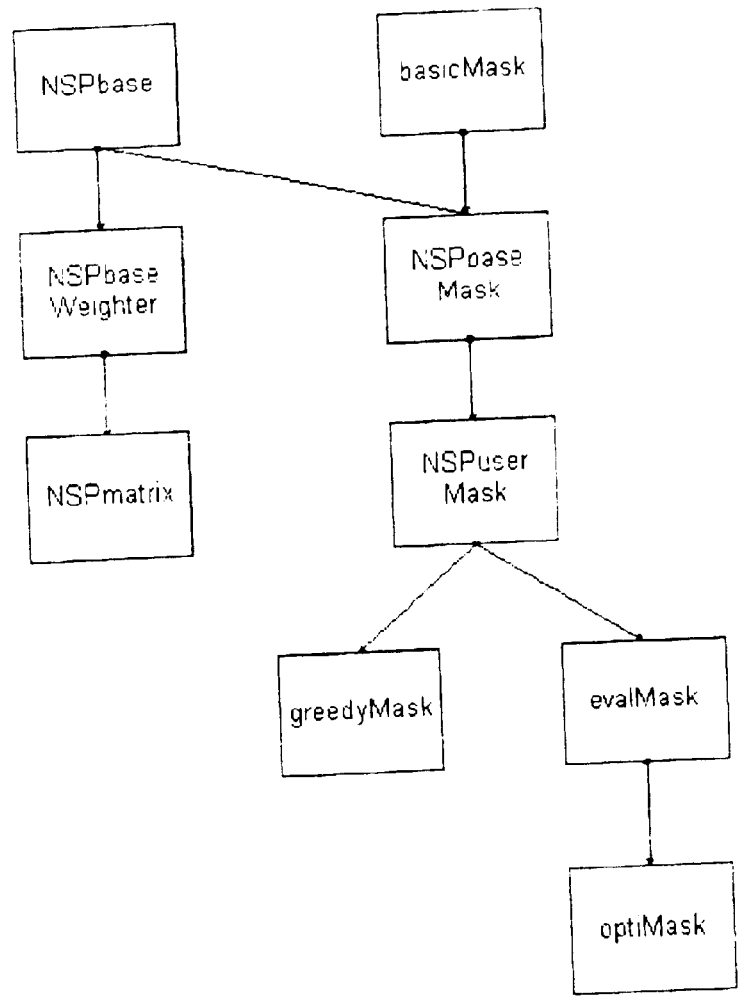
FIG. 34 is a class diagram, showing key classes of a program used for implementation of preferred embodiments of the invention.

The m numbers in row m define which pass numbers will fire if m drops have to be printed. An example will show how it works; in a three-drop-per-pixel (3 dpp) mask, a cell such as shown in FIG. 34 means that:

a) if only one drop is to be printed for this pixel, it will be fired in pass number one;
b) if two drops are to be printed, they will be fired in passes number two and three; and
c) if three drops have to be printed, two of them will be fired in pass number one, and the other in pass number two.

Example of a mask—With this notation, the mask is a group of triangular matrices, each one associated with a pixel on the paper. For example, this could be part of a three-drop-per-pixel, eight-pass mask:

```
 5      4      3
 4 3    3 2    2 1
 2 1 8  1 8 7  8 7 6
 2      1      8
 1 8    8 7    7 6
 7 6 5  6 5 4  5 4 3
 7      6      5
 6 5    5 4    4 3
 4 3 2  3 2 1  2 1 8
```

Restrictions in the form of the cells—Setting d as the number of drops per pixel, the number of potentially different pass numbers that are needed to fill a cell is (d/2)(d+1). This number grows rapidly with the number of drops per pixel; for example, for a four-drop-per-pixel print mode, ten potentially different pass numbers are needed to fill a cell.

This means that if the number of passes is low there is no chance to fulfill any constraint at all between neighbors. Following the same example, if the number of passes is eight, the odds of having all eight numbers in one cell are high, if no restrictions are applied within the cell, and then it is not possible to find a neighbor that does not fire in the same pass number.

Restrictions within the cell can be applied just by forcing the form of the cell. In a three-drop-per-pixel mask, for example, two valid alternative choices appear in FIG. 35.

In both cases, the number of potentially different pass numbers in each cell goes down from (d/2)(d+1) to d, which makes much easier the finding of masks that fulfill constraints between neighbors. The combination of both would lead to an even more restricted cell, in which all the drops would have to be fired in the same pass.

This kind of format restriction should not be regarded as something necessary to the system. It is just a convenient way to reduce the degrees of freedom of the problem, and thus to make it better constrained. It can also be thought as something to keep the pen from firing at impermissible frequencies. For example, for a pen that can fire up to four drops in a pixel at one given pass, but that has to print eight drops per pixel, a possible form for the cell appears in FIG. 37, subject to the condition in FIG. 38.

In FIG. 37 all the c's in each row are a respective common number for that row, but this condition is not mandatory. A less restrictive but still valid form of the matrix requires neither all the same c's in a row nor all the same d's in a row, but rather only that all the d's in each row must be different from all the c's in the same row.

The form shown, however, is more restrictive and leads to a better-conditioned problem. Another valid way of restricting the problem is a matrix in which all the c's are the same, and all the d's are the same, with the only condition of d different from c. This would lead to a cell with just two pass numbers to fill in, and thus to a mask very easy to fill—and yet fulfilling constraints between neighbors.

Applying a constraint matrix to a composite mask—The constraint matrix should be applied exactly in the same way as for a single-drop mask, but extending it to all the numbers in the neighbor cell. Say, for example, that the constraint matrix of FIG. 39 is to be respected, and it is desired to find the missing cell for this mask:

```
 5      4      4
 5 3    4 2    4 2
 5 3 8  4 2 7  4 2 7
 2      3
 2 1    3 5
 2 1 6  3 5 8
```

Applying the constraint matrix, there would be a one in the upper neighbor, and this would forbid options three, one and six, and a one in the left neighbor, and this would forbid options three, five and eight. Therefore, options one, three, five, six and eight are not allowed for this cell. A valid choice would be: pass number two for one drop, passes number two and four for two drops, and passes number two, four and seven for three drops. The finished mask would be as follows.

```
 5      4      3
 5 3    4 2    3 1
 5 3 8  4 2 7  3 1 6
 2      3      2
 2 1    3 5    2 4
 2 1 6  3 5 8  2 4 7
```

Formal approach—This section will give a more formal treatment to what has been presented in the previous section at an example level.

(a) Cell—A cell is a triangular matrix, associated with a pixel in the plot, whose components are natural numbers ranging from unity to the number of passes, nP. The p numbers in the row p of the cell are the pass numbers in which the printer will fire if p drops have to be printed in this pixel. The general format of a cell for d drops per pixel appears in FIG. 40, and the maximum number of different values in it is the larger of:

the number of passes and (d/2)(d+1), if no restrictions are applied in the form of the cell.

(b) Mask—A mask is a rectangular (usually square) array of cells, each one associated with a pixel in the plot. The mask can be either the size of the plot (a runtime designed mask, for example), or a smaller size, in which case it must be tiled to fill the plot.

It has the general form appearing in FIG. 41. Its elements (cells) will be referred to as $m_{f,c}$, where f, c have the usual meaning of row, column (both starting at one).

(c) Constraint matrix—The simplest way to define neighborhood restrictions that the cells on a mask should fulfill is the constraint matrix, as defined earlier. The general form of a constraint matrix is shown in FIG. 42, where X is the pivotal point, and the number $r_{i,j}$ means: for any given position f,c of the mask, all the elements of the cell $C^{f,c}$ are not within the sets defined by the open ranges:

$$] C^{f+i,c+i}{}_{l,m}-r_{i,j}, C^{f+i,c+i}{}_{l,m}+r_{i,j} [ \text{ for all } l,m.$$

(d) Polar symmetric constraint matrix—It can be shown that restricting the form of the constraint matrix to that of FIG. 43 enables a much more efficient way of filling in the mask. Essentially, if the constraint matrix has this form a building strategy of left-to-right, top-to-bottom need account only for the neighbors already chosen (the past) and the future options will automatically fulfill the constraints. Earlier discussion explains how this works, and the validity of the extension to composite masks can be shown.

17. On-the-fly Mask Generation

With minor modifications the mask generation algorithm described above is extended to generate masks—even full-page printmasks—while printing (assuming processor bandwidth) with a minimum of memory usage. As in the form described above, the algorithm applies the matrix to the empty mask, scanning by row or by column until a mask is generated or the algorithm determines that the current mask cannot comply with the constraint matrix. (The latter possibility, however, is preferably foreclosed in use of the invention for on-the-fly mask generation.)

This algorithm can be implemented in printer firmware, or in a driver or in ASIC structure. It requires a minimum of memory usage, dependent on the size of the image.

The algorithm assumes operation of the printing portion of the firmware on the basic principle that at least one swath of data is rendered in memory and available to print. A printmode so constructed may use any number of passes.

In principle this approach can be used to generate masks the size of an entire printed page, even a meter square or more, by operating the program immediately before printing each swath. To accomplish this, it is desirable to save certain data from the previous swath, for use by the program in satisfying spatial and temporal constraints across swath boundaries.

For use in a commercial product, it is desirable to do this with as little memory and as quickly as possible. To that end, it has been determined that it is possible to save only the last few rows, or even just one row, from the previous swath—since that is really all that interacts with the constraints in the NSP file.

If a printmask is generated by columns, sweeping across columns of each swath, then the mask may be generated—keeping just ahead of the pens—even while the printer prints each swath. In this case the mask for the whole swath need not be saved, and at most only a few kilobytes of data need be stored.

Thus at each advance of a printing medium, as each new incremental portion of an image is rendered, much of the printmode remains the same and can be regenerated by using that saved data as a seed. The mask for generating the incremental data can be generated in the same way, provided only that the previously-just-used mask data is treated as a given.

Since the engine of the mask-generation algorithm is a pseudorandom number generator, all that need be stored to regenerate a mask in this way is the seed value and the constraint matrix. Consider again the previously discussed simple constraint matrix alternatively shown as

| N | Y | Y |
|---|---|---|
| Y | X | Y |
| Y | Y | N | where a "Y" or gray square designates a neighbor that is a constraint on the pivotal point "X", and an "N" or black square designates a neighbor that is not a constraint.

Consider again also that the mask in process appears as shown below—but now with the new understanding that the central, question-marked pixel is to print in the first row of a new swath, or in other words that the first two rows of the mask have been already been used in a previous swath. They are therefore unchangeable history, with which the system must reckon.

| 5 | 6 | 4 | 7 | 1 |
|---|---|---|---|---|
| 7 | 1 | 3 | 2 | 4 |
| 5 | 8 | ? |   |   |
|   |   |   |   |   |
|   |   |   |   |   |

These first two rows of the mask were generated while printing the Previous swath.

As may be recalled, the processing superposes the constraint matrix on the mask, using the saved data from the previous swath to constrain the current swath as shown here.

| 5 | 6 | 4 | 7 | 1 |
|---|---|---|---|---|
| 7 |   | 3 | 2 | 4 |
| 5 |   | X |   |   |
|   |   |   |   |   |
|   |   |   |   |   |

For "X" in the mask as shown above, the only three values that come into play in constraining the value chosen for "X" are the numbers three and two in the row immediately above, and the eight to the left.

In other words, the information in the top row is not necessary for determination of permissible values at "X". The example demonstrates that in this case of a three-by-three matrix only the last row of a previous swath is needed, because the constraint matrix extends only one row above the current position.

To summarize, the size of the constraint matrix determines the number of rows from the previous swath that must be saved for generation of the masks for the next swath. If, as in the case shown above, only one row of data need be saved, then for example—for an E-size or A0-size page—this means:

4 colors·34 inches·600 dpi·1 bit/pixel·1 row=40,800 bytes.

Changes to the page width or the number of previous raster rows saved will impact the amount of memory required. Nevertheless, this approach enables generation of a full-page printmode mask with an extremely small fraction of the memory necessary to store a full page of data.

18. Halftone Mask Generation

It should now be clear that the algorithm applies equally well to a printmode with four passes and one with ten passes.

Therefore, as indicated in earlier portions of this document the present invention also encompasses creation of halftoning masks, which are typically 256-level matrices.

The difference between generation of halftoning masks and generation of printmasks is primarily a matter of focus—upon, respectively, distribution of "level" values within a multiple-level regime, or distribution of inkdrops in time (i. e., as between different printing passes). Making allowance for these differences of focus, basically the self-same calculation procedures are used in either application of the present invention.

More specifically, whereas an NSP file for printmask generation may be operating upon a domain, so to speak, of eight passes, an NSP file for halftone-mask generation operates upon a domain of 256 levels (ordinarily levels zero through 255).

Generating a good halftoning mask is challenging. A halftone-mask constraint matrix, however, defines the characteristics of the challenge in a particularly simple, objective and quantifiable way—setting aside the uninteresting mechanics of the mask construction process itself. This isolation of the real substance of the mask properties lends itself to a very efficient and insightful exploration of solutions.

19. Hardware for Implementing the Invention

Figures 44, 45:
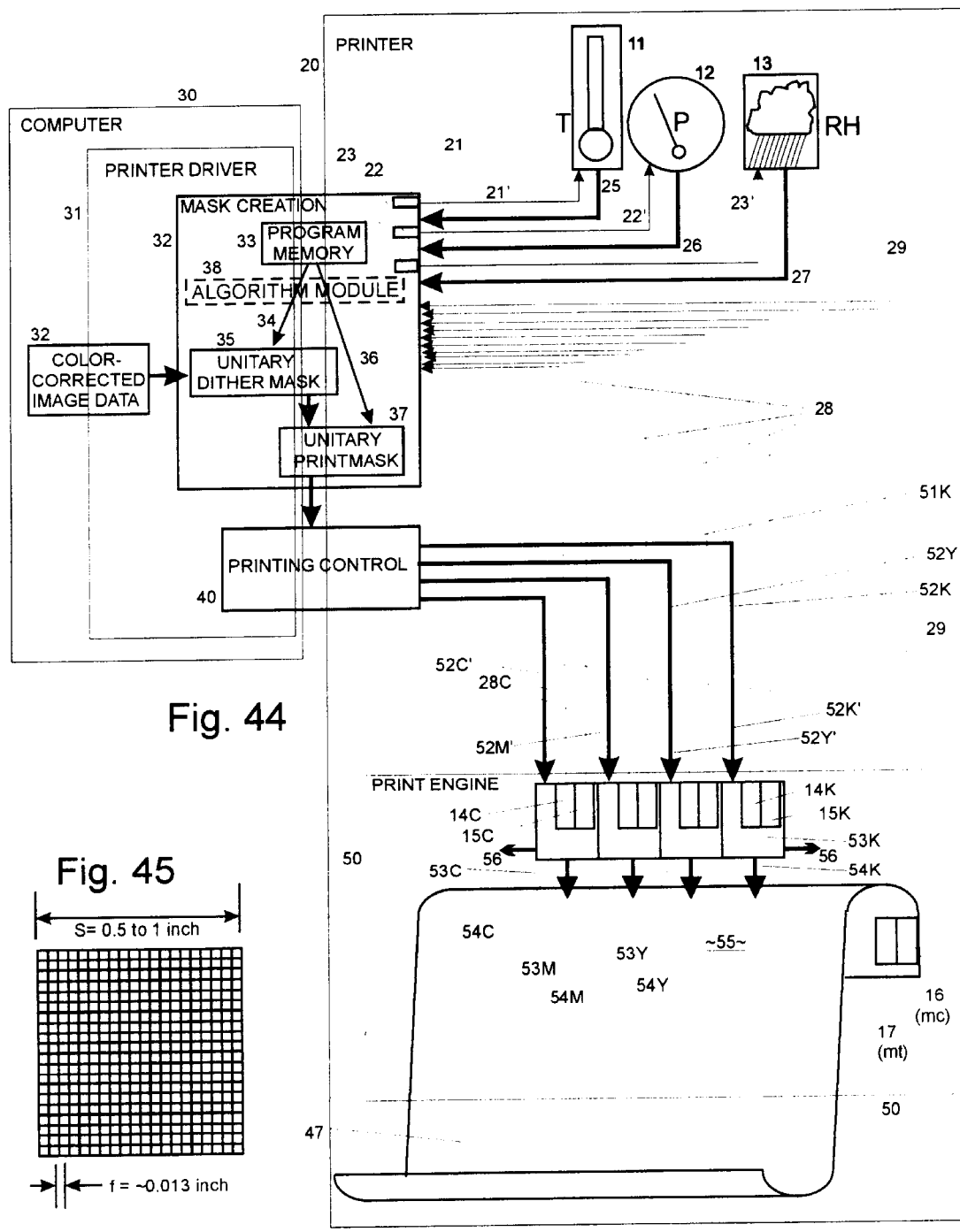
FIG. 44 is a block-diagrammatic representation of a hardware system according to the invention.
FIG. 45 is a diagram showing very schematically the size of a mask created according to preferred embodiments of the invention, relative to spatial frequencies to which the human eye is typically most sensitive.

Preferred embodiments of the invention operate in a printer 20 (FIG. 44) that includes a print engine 50 and is coupled to a computer 31 (usually a personal computer or workstation) that includes a printer driver 31. Data 32 typically resides in the computer, typically in some graphics application program, but often is partially developed or refined in the driver 31—as is symbolized by the position of the data block 32 partially inside the driver 31.

The hardware of the present invention may most typically be a microprocessor and memory residing in the printer 20, operating in conjunction with the printer driver 31; however, in many cases the mask-creation capability 32 and its target printing-control block 40 are distributed partially in the driver 31 and partially in the printer 20—again as represented in the drawing by the positions of the blocks 32, 40 spanning the driver and printer blocks 31, 20.

The heart of the present invention is the mask-creation block 32, which includes a program memory that controls generation 34, 36 of a unitary dither mask 35 or a unitary printmask 37, or both. An effort has been made to symbolize the data-compression characteristic of the invention here by drawing the program-memory block smaller than each of the mask blocks 35, 37.

The program, however, actually controls generation of masks through the algorithm module 38, which resides in a part of the program memory 33. Much of the remainder of that memory is occupied by the NSP file discussed earlier.

To enable the previously introduced adaptive features of the invention, the mask-creation block 32 receives inputs 28 of information 28 that has been encoded into or generated within devices 14, 15 in the several pens 53C, 53M, 53Y, 53K (cyan, magenta, yellow and black respectively). The information encoding or generating devices report on pen dropweight, nozzle behavior, pen age and the like.

The mask-creation block 32 also receives inputs 29 of information about the present printing medium 47. This information once again may be found from encoding or sensors at the medium. Such information sources relate to medium color 16 or type 17, or both.

Further, devices 21–23 in the mask-creation block send queries 21'–23' to environmental sensors 11–13, to determine temperature T, pressure P or humidity RH, or combinations of these as desired. The sensors respond with the corresponding informational signals 25–27.

When the image data 32 is processed through the dither mask 35 and printmask 37, output signals proceed to the printing-control block which issues commands 52C'–52K' to the respective pens for ejection of ink 54C–54-K to form an image 55 on the printing medium 47. The system downstream of the printing control block 40 may be substantially conventional, or may be in part or wholly made up of new writing systems not now known.

A printmask 37 generated by preferred embodiments of the invention is ideally rectangular or square (FIG. 45) with sides s=1¼ to 2½ cm (0.5 to 1 inch) for the reasons previously explained. The diagram also represents a typical distance d corresponding to a spatial frequency to which human eyes are most sensitive, and as can be seen the two distances s, d are very distinctly different.

20. Operation of the Invention

Figure 46:
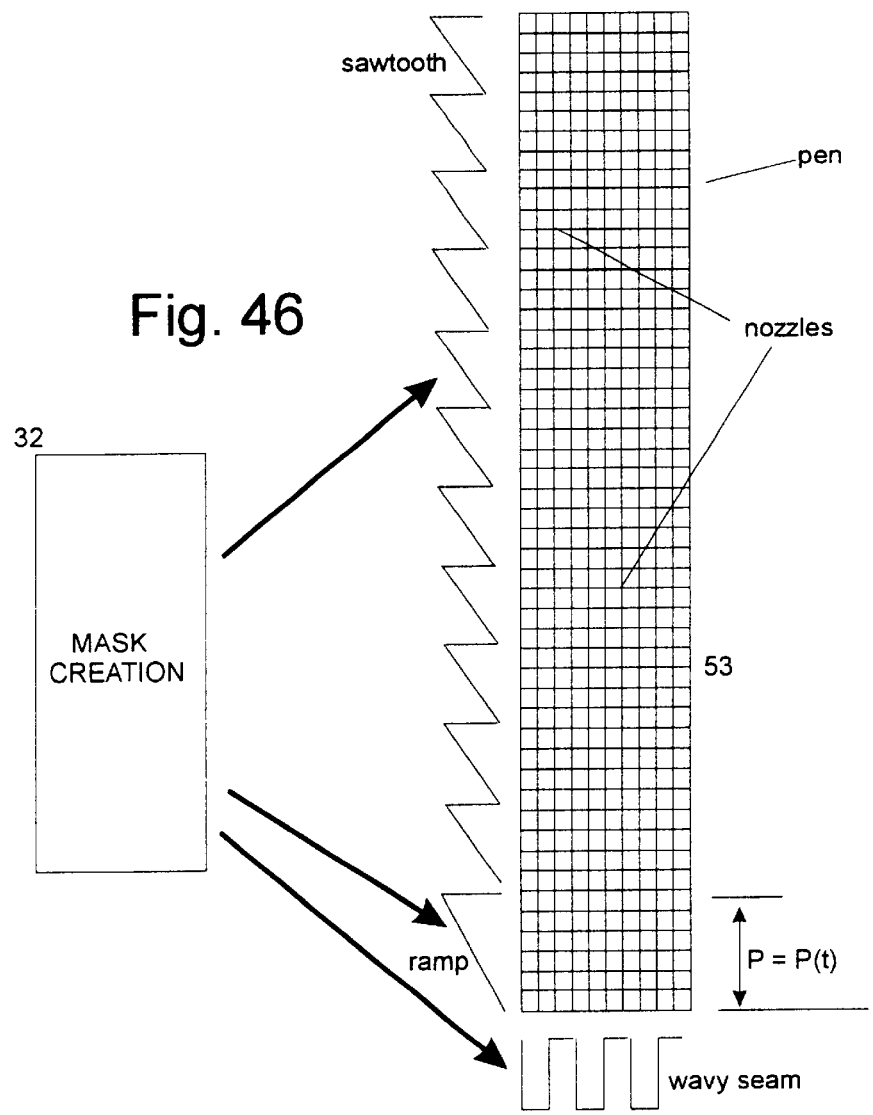
FIG. 46 is a highly schematic diagram illustrating the imposition of pen nozzle modulations by the mask-creation block in FIG. 44.

The mask-creation block 32 of preferred embodiments of the invention, in addition to determining pass numbers for deposition of desired inkdrops, also advantageously imposes a nozzle-usage ramp, over a distance P (FIG. 46) at the leading edge of each pen. A sawtooth distribution of nozzle usage, longitudinally of the pen, is also graphed in the diagram, together with a square-wave distribution of nozzle usage transversely.

Figure 47:
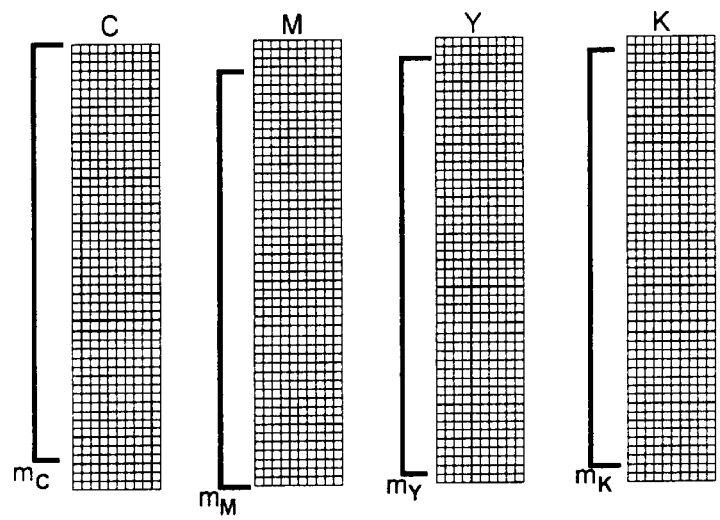
FIG. 47 is a very schematic diagram showing the use of intentionally nonaligned nozzle groups in substantially aligned pens.

Preferred embodiments also provide relatively offset masks $m_c$ (FIG. 47) for the cyan pen C, $m_M$ for the magenta pen M, $m_Y$ for the yellow pen Y, and $m_K$ for the black pen K. These offsets represent staggering effect mentioned earlier, for purposes of separating seams.

These several effects are preferably but not necessarily time varying. As noted previously those of the effects that represent underinking in some regions of the pen also are preferably compensated by overinking elsewhere.

Figure 48:
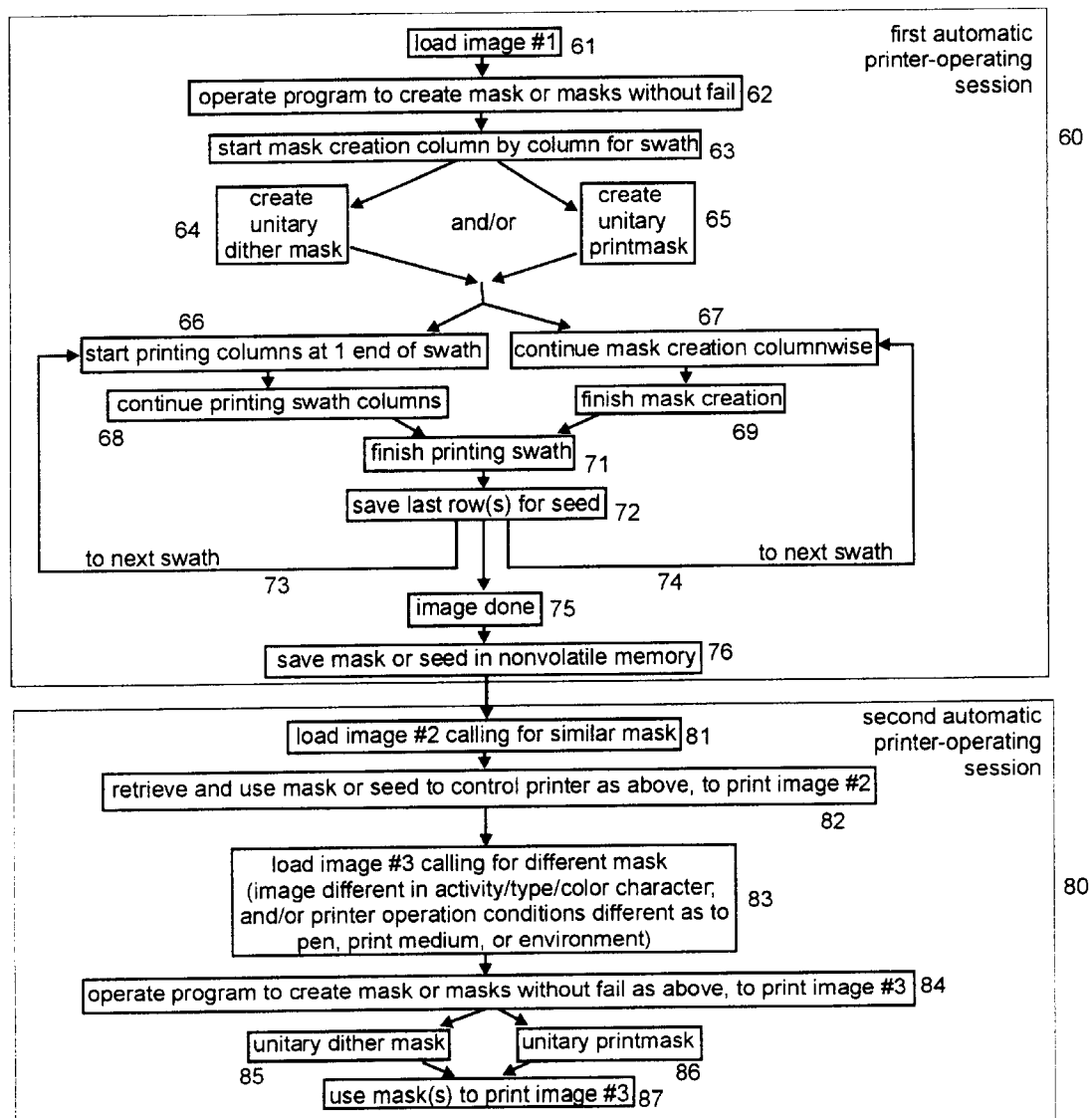
FIG. 48 is a flow chart showing operation of procedures preferably performed by the hardware system.

In operation for mask-on-demand performance, a first image may be loaded 61 (FIG. 48) into system memory, and the program operated to a dither or printmask, or both. The program is set, by restraining the number of constraints in operation, so that—as long as the system is operating correctly—a mask is always produced 62 without fail.

Mask creation is thereby started 63, and for the reasons stated earlier this is preferably accomplished on a column-by-column basis. In the process the system produces 64 a unitary dither mask, or creates a unitary printmask 65. The significance of the term "unitary" here has been explained in an earlier section.

The simultaneous operation of the printing procedure 66, 68, 71 and the columnwise mask creation 67, 69 will be clear from the diagram, for people skilled in this field. as a swath finishes 71 printing, the final row or rows in the swath are saved 72 to reinitialize 73, 74 both the printing and the mask creation, respectively, for the immediately following swath.

When the image is finished 75, if the printer-operating session 60 is about to end (i. e., if the machine will be turned off), the mask or seed as preferred is saved 76 to nonvolatile memory. When the next operating session 80 begins, the next image to be printed may be one calling for a similar mask.

If so, then when such an image is loaded 81 the system retrieves and uses 82 the mask or seed previously saved in nonvolatile memory. When the next image calling for a different mask is loaded 83, however, the system instead restarts 84 the original procedure shown at the top of the diagram.

Figure 49:
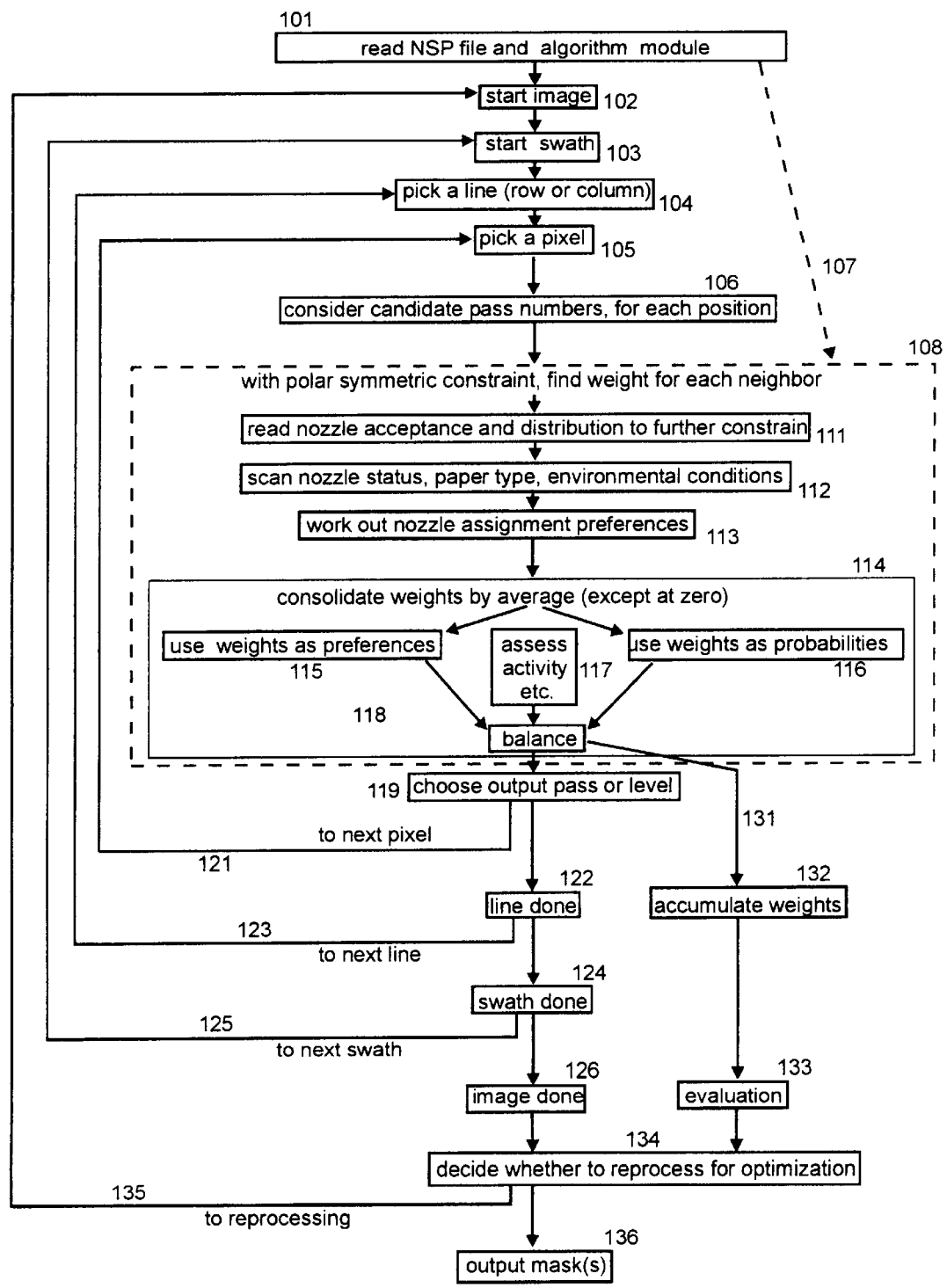
FIG. 49 is a like view for other features.

Other earlier-discussed features of preferred embodiments are diagramed in FIG. 49. In view of those earlier discussions and the foregoing presentation of FIG. 48, it is believed that this diagram will be self explanatory.

It may bear emphasis, however, that the dashed box 108 represents elements that are readily modularized in accordance with the structural design of the program.

The above disclosure is intended as merely exemplary, and not to limit the scope of the invention—which is to be determined by reference to the appended claims.

What is claimed is:

1. A method of preparing and using a mask for incremental printing, using a preestablished program at incorporates complete conditions for a usable printmask or dither mask; said method comprising the steps of:

automatically operating said preestablished program that incorporates complete conditions for a usable printmask or dither mask, to produce a usable substantially unitary printmask or dither mask in substantially each attempt by the program; and then automatically using or storing for later use, substantially in common over an entire image and substantially without human intervention as to mask content, the produced substantially unitary printmask or dither mask.

2. The method of claim 1, wherein:

the operating step produces a printmask.

3. A method of preparing and using a printmask or dither mask for incremental printing; said method comprising the steps of:

for each pixel position in a printmask or dither mask to be prepared, identifying nearby positions only by a substantially generalized explicit notation that is relative, substantially without reference to absolute position in the mask;

with respect to each nearby position that is thus identified by the generalized notation, expressing in only a substantially generalized explicit notation the acceptability of inking said pixel position in particular inkdrop planes of the mask.

4. The method of claim 3, wherein:

the expressing step comprises applying a condition that is substantially polar symmetric.

5. The method of claim 3, wherein:

the identifying step comprises identifying nearby positions in a printmask.

* * * * *